United States Patent
Fukunaga

(10) Patent No.: US 9,915,336 B1
(45) Date of Patent: Mar. 13, 2018

(54) BICYCLE SPROCKET ASSEMBLY

(71) Applicant: SHIMANO INC., Sakai (JP)

(72) Inventor: Yasufumi Fukunaga, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/265,814

(22) Filed: Sep. 14, 2016

(51) Int. Cl.
 *F16H 55/12* (2006.01)
 *F16H 55/30* (2006.01)
 *B62M 9/10* (2006.01)

(52) U.S. Cl.
 CPC ............... *F16H 55/30* (2013.01); *B62M 9/10* (2013.01)

(58) Field of Classification Search
 CPC .......... B62M 9/10; B62M 9/105; B62M 9/12; F16H 55/30; F16H 55/08
 USPC ........................................................ 474/160
 See application file for complete search history.

(56) References Cited

U.S. PATENT DOCUMENTS

| | | | | |
|---|---|---|---|---|
| 5,192,248 A * | 3/1993 | Nagano | ..................... | B62M 9/10 474/140 |
| 5,192,249 A * | 3/1993 | Nagano | ..................... | B62M 9/10 474/160 |
| 5,413,534 A * | 5/1995 | Nagano | ..................... | B62M 9/10 474/160 |
| 5,458,543 A * | 10/1995 | Kobayashi | ............... | B62M 9/10 474/160 |
| 5,464,373 A * | 11/1995 | Leng | ..................... | B62M 9/105 474/140 |
| 5,545,096 A * | 8/1996 | Su | ............................ | B62M 9/10 474/160 |
| 5,609,536 A * | 3/1997 | Hsu | .......................... | B62M 9/10 474/160 |
| 5,738,603 A * | 4/1998 | Schmidt | .................... | B62M 9/10 474/158 |
| 5,876,296 A * | 3/1999 | Hsu | .......................... | B62M 9/10 474/140 |
| 5,971,878 A * | 10/1999 | Leng | ...................... | F16H 55/30 474/160 |
| 6,007,442 A * | 12/1999 | Schmidt | ................... | B62M 9/10 474/122 |
| 6,013,001 A * | 1/2000 | Miyoshi | ................... | B62M 9/10 474/156 |

(Continued)

FOREIGN PATENT DOCUMENTS

| EP | 0047927 | 3/1982 |
|---|---|---|
| JP | 62-23187 U | 2/1987 |
| JP | 62-65387 U | 4/1987 |

*Primary Examiner* — Henry Y Liu
(74) *Attorney, Agent, or Firm* — Mori & Ward, LLP

(57) ABSTRACT

A bicycle sprocket assembly comprises a first sprocket and a second sprocket. The first sprocket comprises a first sprocket body, a first shifting facilitation area, a plurality of first chain-driving teeth, and a first outer diameter. The second sprocket comprises a second sprocket body, a plurality of second chain-driving teeth, a second outer diameter, and a support protuberance. The support protuberance protrudes from the second sprocket body toward the first sprocket. The support protuberance is provided in a circumferential support area on the second sprocket. The circumferential support area is configured to face a circumferential area on the first sprocket in an axial direction. The circumferential area extends from a third tooth to a fifth tooth in a circumferential direction with respect to a rotational center axis.

32 Claims, 16 Drawing Sheets

(56) References Cited

U.S. PATENT DOCUMENTS

| | | | | |
|---|---|---|---|---|
| 6,045,472 A * | 4/2000 | Sung | ............... | B62M 9/10 474/158 |
| 6,139,456 A * | 10/2000 | Lii | ............... | B62M 9/10 474/152 |
| 6,340,338 B1 * | 1/2002 | Kamada | ............... | B62M 9/122 474/152 |
| 6,572,500 B2 * | 6/2003 | Tetsuka | ............... | B62M 9/10 474/160 |
| 6,923,741 B2 * | 8/2005 | Wei | ............... | B62M 9/10 474/152 |
| 7,004,867 B2 * | 2/2006 | Wei | ............... | B62M 9/10 474/152 |
| 7,503,864 B2 * | 3/2009 | Nonoshita | ............... | B62M 9/105 474/160 |
| 7,942,771 B2 * | 5/2011 | Kamada | ............... | B62M 9/10 474/152 |
| 8,066,603 B2 * | 11/2011 | Braedt | ............... | B62M 9/10 474/160 |
| 8,092,329 B2 * | 1/2012 | Wickliffe | ............... | B62M 9/105 474/160 |
| 8,226,511 B2 * | 7/2012 | Kamada | ............... | B62M 9/10 474/152 |
| 8,235,850 B2 * | 8/2012 | Lin | ............... | B62M 9/105 474/160 |
| 8,506,436 B2 * | 8/2013 | Wickliffe | ............... | B62M 9/105 474/160 |
| 8,550,944 B2 * | 10/2013 | Esquibel | ............... | B62M 9/10 474/160 |
| 8,617,015 B2 * | 12/2013 | Wickliffe | ............... | F16H 55/30 474/140 |
| 8,821,329 B2 * | 9/2014 | Wickliffe | ............... | B62M 9/105 474/140 |
| 9,297,450 B2 * | 3/2016 | Numata | ............... | F16H 55/08 |
| 9,334,014 B2 * | 5/2016 | Fukunaga | ............... | B62M 9/10 |
| 9,376,165 B2 * | 6/2016 | Oishi | ............... | B62M 9/10 |
| 9,457,870 B2 * | 10/2016 | Sugimoto | ............... | B62M 9/105 |
| 9,463,844 B2 * | 10/2016 | Fukunaga | ............... | B62M 9/10 |
| 9,701,364 B2 * | 7/2017 | Sugimoto | ............... | B62M 9/10 |
| 2002/0006842 A1 * | 1/2002 | Tetsuka | ............... | B62M 9/10 474/160 |
| 2007/0054768 A1 * | 3/2007 | Miyazawa | ............... | F16H 55/30 474/152 |
| 2010/0004081 A1 * | 1/2010 | Braedt | ............... | B62M 9/12 474/160 |
| 2012/0202633 A1 * | 8/2012 | Wickliffe | ............... | B62M 9/105 474/160 |
| 2013/0139642 A1 * | 6/2013 | Reiter | ............... | B62M 9/105 74/594.2 |
| 2016/0059931 A1 * | 3/2016 | Fukunaga | ............... | B62M 9/10 474/158 |

* cited by examiner

BICYCLE SPROCKET ASSEMBLY

BACKGROUND OF THE INVENTION

Field of the Invention

The present invention relates to a bicycle sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket assembly comprises a first sprocket and a second sprocket. The first sprocket comprises a first sprocket body, a first shifting facilitation area, a plurality of first chain-driving teeth, and a first outer diameter. The first sprocket body includes a first radially outer periphery provided about a rotational center axis of the bicycle sprocket assembly. The first shifting facilitation area is to facilitate a shifting operation of a bicycle chain. The plurality of first chain-driving teeth is provided on the first radially outer periphery to engage with the bicycle chain. The plurality of first chain-driving teeth include a first tooth, a second tooth, a third tooth, a fourth tooth, and a fifth tooth which are circumferentially arranged in order and which are adjacent to each other without another tooth therebetween. The first tooth is provided in the first shifting facilitation area and provided on an upstream side of the fifth tooth in a driving rotational direction in which the bicycle sprocket assembly is rotated about the rotational center axis during pedaling. The first outer diameter is defined by the plurality of first chain-driving teeth. The second sprocket is adjacent to the first sprocket in an axial direction parallel to the rotational center axis without another sprocket between the first sprocket and the second sprocket. The second sprocket comprises a second sprocket body, a plurality of second chain-driving teeth, a second outer diameter, and a support protuberance. The second sprocket body includes a second radially outer periphery provided about the rotational center axis of the bicycle sprocket assembly. The plurality of second chain-driving teeth are provided on the second radially outer periphery to engage with the bicycle chain. The second outer diameter is defined by the plurality of second chain-driving teeth. The second outer diameter is larger than the first outer diameter. The support protuberance protrudes from the second sprocket body toward the first sprocket. The support protuberance is provided in a circumferential support area on the second sprocket. The circumferential support area is configured to face a circumferential area on the first sprocket in the axial direction. The circumferential area extends from the third tooth to the fifth tooth in a circumferential direction with respect to the rotational center axis.

With the bicycle sprocket assembly according to the first aspect, the support protuberance axially supports the bicycle chain when the bicycle chain is engaged with the first sprocket. Accordingly, it is possible to improve the chain-holding performance of the bicycle sprocket assembly in the first shifting facilitation area of the first sprocket when the bicycle chain is engaged with the first sprocket.

In accordance with a second aspect of the present invention, the bicycle sprocket assembly according to the first aspect is configured so that the support protuberance is configured to axially face one of an opposed pair of outer link plates of the bicycle chain in a state where the opposed pair of outer link plates of the bicycle chain engage with the fourth tooth.

With the bicycle sprocket assembly according to the second aspect, it is possible to improve the chain-holding performance of the bicycle sprocket assembly in the first shifting facilitation area of the first sprocket when the opposed pair of outer link plates of the bicycle chain is engaged with the fourth tooth.

In accordance with a third aspect of the present invention, the bicycle sprocket assembly according to the first or second aspect is configured so that the support protuberance has a circumferential protuberance-length that is equal to or smaller than a circumferential distance defined between a non-driving surface of the third tooth and a driving surface of the fifth tooth in the circumferential direction.

With the bicycle sprocket assembly according to the third aspect, it is possible to make the support protuberance compact. Thus, it is possible to utilize an area around the support protuberance for other elements.

In accordance with a fourth aspect of the present invention, the bicycle sprocket assembly according to any one of the first to third aspects is configured so that at least part of the support protuberance is positioned radially inward from a root circle of the second sprocket.

With the bicycle sprocket assembly according to the fourth aspect, it is possible to utilize an area provided radially inward from the root circle for the support protuberance.

In accordance with a fifth aspect of the present invention, the bicycle sprocket assembly according to any one of the first to fourth aspects is configured so that the first tooth has an axial chain-engaging width that is smallest among the first tooth, the second tooth, and the third tooth.

With the bicycle sprocket assembly according to the fifth aspect, it is possible to reduce interference between the first tooth and the bicycle chain when the bicycle chain is derailed from the first sprocket.

In accordance with a sixth aspect of the present invention, the bicycle sprocket assembly according to any one of the first to fifth aspects is configured so that the fifth tooth is closer to the support protuberance than the first tooth in the circumferential direction.

With the bicycle sprocket assembly according to the sixth aspect, it is possible to further improve the chain-holding performance of the bicycle sprocket assembly around the fifth tooth.

In accordance with a seventh aspect of the present invention, the bicycle sprocket assembly according to any one of the first to sixth aspects is configured so that the fifth tooth is closer to the support protuberance than the second tooth in the circumferential direction.

With the bicycle sprocket assembly according to the seventh aspect, it is possible to further improve the chain-holding performance of the bicycle sprocket assembly around the fifth tooth.

In accordance with an eighth aspect of the present invention, the bicycle sprocket assembly according to any one of the first to seventh aspects is configured so that the support protuberance is disposed to overlap with the fourth tooth when viewed from the axial direction.

With the bicycle sprocket assembly according to the eighth aspect, it is possible to improve the chain-holding performance of the bicycle sprocket assembly around the fourth tooth.

In accordance with a ninth aspect of the present invention, the bicycle sprocket assembly according to any one of the first to eighth aspects is configured so that the second tooth is provided in the first shifting facilitation area.

With the bicycle sprocket assembly according to the ninth aspect, it is possible to facilitate the shifting operation using the second tooth.

In accordance with a tenth aspect of the present invention, the bicycle sprocket assembly according to any one of the first to ninth aspects is configured so that the third tooth is provided in the first shifting facilitation area.

With the bicycle sprocket assembly according to the tenth aspect, it is possible to facilitate the shifting operation using the third tooth.

In accordance with an eleventh aspect of the present invention, the bicycle sprocket assembly according to any one of the first to tenth aspects is configured so that the fourth tooth is provided in the first shifting facilitation area.

With the bicycle sprocket assembly according to the eleventh aspect, it is possible to facilitate the shifting operation using the fourth tooth.

In accordance with a twelfth aspect of the present invention, the bicycle sprocket assembly according to any one of the first to eleventh aspects is configured so that the fifth tooth is provided in the first shifting facilitation area.

With the bicycle sprocket assembly according to the twelfth aspect, it is possible to facilitate the shifting operation using the fifth tooth.

In accordance with a thirteenth aspect of the present invention, the bicycle sprocket assembly according to any one of the first to twelfth aspects further comprises a first shifting facilitation recess to facilitate the shifting operation of the bicycle chain. The first sprocket comprises a first axial surface and a first additional axial surface provided on a reverse side of the first axial surface in the axial direction. The first additional axial surface faces toward the second sprocket. The first shifting facilitation recess is provided in the first shifting facilitation area and is disposed on the first axial surface.

With the bicycle sprocket assembly according to the thirteenth aspect, it is possible to facilitate the shifting operation of the bicycle chain using the first shifting facilitation recess on the first axial surface.

In accordance with a fourteenth aspect of the present invention, the bicycle sprocket assembly according to the thirteenth aspect is configured so that the first shifting facilitation recess includes a first circumferential end and a second circumferential end. The first shifting facilitation recess extends between the first circumferential end and the second circumferential end in the circumferential direction. The first tooth is provided in a circumferential recess area defined between the first circumferential end and the second circumferential end in the circumferential direction.

With the bicycle sprocket assembly according to the fourteenth aspect, it is possible to reduce interference between the first tooth and the bicycle chain in the first shifting facilitation recess.

In accordance with a fifteenth aspect of the present invention, the bicycle sprocket assembly according to the fourteenth aspect is configured so that the second tooth is provided in the circumferential recess area.

With the bicycle sprocket assembly according to the fifteenth aspect, it is possible to reduce interference between the second tooth and the bicycle chain in the first shifting facilitation recess.

In accordance with a sixteenth aspect of the present invention, the bicycle sprocket assembly according to the fourteenth or fifteenth aspect is configured so that the third tooth is provided in the circumferential recess area.

With the bicycle sprocket assembly according to the sixteenth aspect, it is possible to reduce interference between the third tooth and the bicycle chain in the first shifting facilitation recess.

In accordance with a seventeenth aspect of the present invention, the bicycle sprocket assembly according to any one of the fourteenth to sixteenth aspects is configured so that the fourth tooth is provided outside the circumferential recess area.

With the bicycle sprocket assembly according to the seventeenth aspect, it is possible to utilize the fourth tooth as a shifting facilitation tooth to facilitate an axial movement of the bicycle chain relative to the first sprocket to smoothly disengage the bicycle chain from the first sprocket in the shifting operation.

In accordance with an eighteenth aspect of the present invention, the bicycle sprocket assembly according to any one of the fourteenth to seventeenth aspects is configured so that the fifth tooth is provided outside the circumferential recess area.

With the bicycle sprocket assembly according to the eighteenth aspect, it is possible to utilize the fifth tooth as a shifting facilitation tooth to facilitate the axial movement of the bicycle chain relative to the first sprocket to smoothly disengage the bicycle chain from the first sprocket in the shifting operation.

In accordance with a nineteenth aspect of the present invention, the bicycle sprocket assembly according to any one of the first to eighteenth aspects is configured so that the support protuberance has a circular outline when viewed from the axial direction.

With the bicycle sprocket assembly according to the nineteenth aspect, it is possible to easily form the support protuberance.

In accordance with a twentieth aspect of the present invention, the bicycle sprocket assembly according to any one of the first to nineteenth aspects is configured so that the second sprocket comprises a second axial surface, a second additional axial surface, and second shifting facilitation recesses. The second axial surface faces toward the first sprocket. The second additional axial surface is provided on a reverse side of the second axial surface in the axial direction. The second shifting facilitation recesses are to facilitate the shifting operation of the bicycle chain. The second shifting facilitation recesses are provided on the second axial surface. The support protuberance is provided between adjacent two recesses of the second shifting facilitation recesses in the circumferential direction.

With the bicycle sprocket assembly according to the twentieth aspect, it is possible to improve the chain-holding performance of the bicycle sprocket assembly when the bicycle chain is engaged with the first sprocket with facilitating the shifting operation on the second sprocket.

In accordance with a twenty-first aspect of the present invention, the bicycle sprocket assembly according to any one of the first to twentieth aspects is configured so that the first sprocket comprises an additional support protuberance protruding from the first sprocket body away from the second sprocket.

With the bicycle sprocket assembly according to the twenty-first aspect, it is possible to axially support the bicycle chain when the bicycle chain is engaged with another sprocket adjacent to the first sprocket.

In accordance with a twenty-second aspect of the present invention, the bicycle sprocket assembly according to the twenty-first aspect is configured so that the additional support protuberance is closer to the first tooth than the support protuberance in the circumferential direction.

With the bicycle sprocket assembly according to the twenty-second aspect, it is possible to improve the chain-holding performance of the bicycle sprocket assembly around the first tooth.

In accordance with a twenty-third aspect of the present invention, the bicycle sprocket assembly according to the twenty-first or twenty-second aspect is configured so that the additional support protuberance is provided outside the first shifting facilitation area when viewed from the axial direction.

With the bicycle sprocket assembly according to the twenty-third aspect, it is possible to improve the chain-holding performance of the bicycle sprocket assembly outside the first shifting facilitation area when the bicycle chain is engaged with another sprocket adjacent to the first sprocket.

In accordance with a twenty-fourth aspect of the present invention, a bicycle sprocket assembly comprises a first sprocket and a second sprocket. The first sprocket comprises a first sprocket body, a first shifting facilitation area, a plurality of first chain-driving teeth, and a first outer diameter. The first sprocket body includes a first radially outer periphery provided about a rotational center axis of the bicycle sprocket assembly. The first shifting facilitation area is to facilitate a shifting operation of a bicycle chain. The plurality of first chain-driving teeth are provided on the first radially outer periphery to engage with the bicycle chain. The plurality of first chain-driving teeth include a first tooth being provided in the first shifting facilitation area. The first outer diameter is defined by the plurality of first chain-driving teeth. The second sprocket is adjacent to the first sprocket in an axial direction parallel to the rotational center axis without another sprocket between the first sprocket and the second sprocket. The second sprocket comprises a second sprocket body, a plurality of second chain-driving teeth, a second outer diameter, and a support protuberance. The second sprocket body includes a second radially outer periphery provided about the rotational center axis of the bicycle sprocket assembly. The plurality of second chain-driving teeth are provided on the second radially outer periphery to engage with the bicycle chain. The second outer diameter is defined by the plurality of second chain-driving teeth. The second outer diameter is larger than the first outer diameter. The support protuberance protrudes from the second sprocket body toward the first sprocket. The support protuberance is positioned in a downstream side with respect to the first tooth in a driving rotational direction in which the bicycle sprocket assembly is rotated about the rotational center axis during pedaling. The support protuberance is configured to axially face one of an opposed pair of outer link plates of the bicycle chain in a state where the opposed pair of outer link plates of the bicycle chain engage with the first sprocket. The support protuberance is spaced apart from a circumferential tooth center line of the first tooth at least by 6 mm in a circumferential direction with respect to the rotational center axis.

With the bicycle sprocket assembly according to the twenty-fourth aspect, the support protuberance axially supports the bicycle chain in a specific area spaced apart from the circumferential tooth center line of the first tooth at least by 6 mm when the bicycle chain is engaged with the first sprocket. Accordingly, it is possible to improve the chain-holding performance of the bicycle sprocket assembly in the specific area when the bicycle chain is engaged with the first sprocket.

In accordance with a twenty-fifth aspect of the present invention, the bicycle sprocket assembly according to the twenty-fourth aspect is configured so that the support protuberance is spaced apart from the circumferential tooth center line of the first tooth at least by 30 mm in the circumferential direction.

With the bicycle sprocket assembly according to the twenty-fifth aspect, the support protuberance axially supports the bicycle chain in a specific area spaced apart from the circumferential tooth center line of the first tooth at least by 30 mm when the bicycle chain is engaged with the first sprocket. Accordingly, it is possible to improve the chain-holding performance of the bicycle sprocket assembly in the specific area when the bicycle chain is engaged with the first sprocket.

In accordance with a twenty-sixth aspect of the present invention, the bicycle sprocket assembly according to the twenty-fourth or twenty-fifth aspect is configured so that the support protuberance is spaced apart from the circumferential tooth center line of the first tooth at most by 45 mm in the circumferential direction.

With the bicycle sprocket assembly according to the twenty-sixth aspect, the support protuberance axially supports the bicycle chain in the specific area spaced apart from the circumferential tooth center line of the first tooth at most by 45 mm when the bicycle chain is engaged with the first sprocket. Accordingly, it is possible to improve the chain-holding performance of the bicycle sprocket assembly in the specific area when the bicycle chain is engaged with the first sprocket.

In accordance with a twenty-seventh aspect of the present invention, the bicycle sprocket assembly according to any one of the twenty-fourth to twenty-sixth aspects is configured so that the support protuberance is spaced apart from the circumferential tooth center line of the first tooth at most by 70 mm in the circumferential direction.

With the bicycle sprocket assembly according to the twenty-seventh aspect, the support protuberance axially supports the bicycle chain in a specific area spaced apart from the circumferential tooth center line of the first tooth at most by 70 mm when the bicycle chain is engaged with the first sprocket. Accordingly, it is possible to improve the chain-holding performance of the bicycle sprocket assembly in the specific area when the bicycle chain is engaged with the first sprocket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
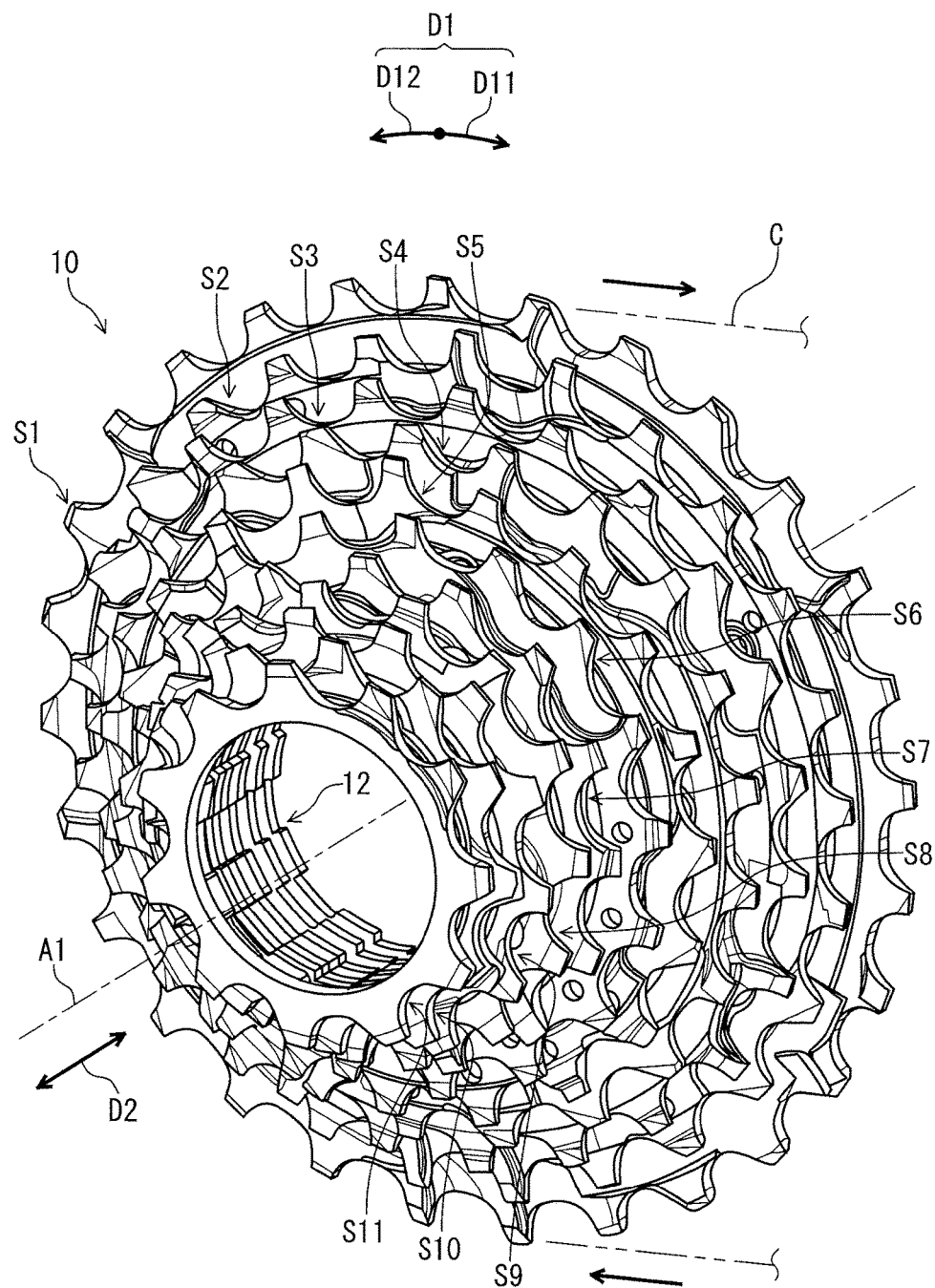
FIG. 1 is a perspective view of a bicycle sprocket assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle sprocket assembly 10 including a bicycle sprocket in accordance with a first embodiment is illustrated. The bicycle sprocket assembly 10 is configured to engage with a bicycle chain C. In this embodiment, the bicycle sprocket assembly 10 comprises eleven bicycle sprockets S1 to S11. The bicycle sprocket assembly 10 has a rotational center axis A1. The bicycle sprocket assembly 10 is rotatable about the rotational center axis A1 in a driving rotational direction D11 during the pedaling. The driving rotational direction D11 is defined along a circumferential direction D1 of the bicycle sprocket assembly 10. A reversing rotational direction D12 is a reverse direction of the driving rotational direction D11 and is defined along the circumferential direction D1.

Figure 2:
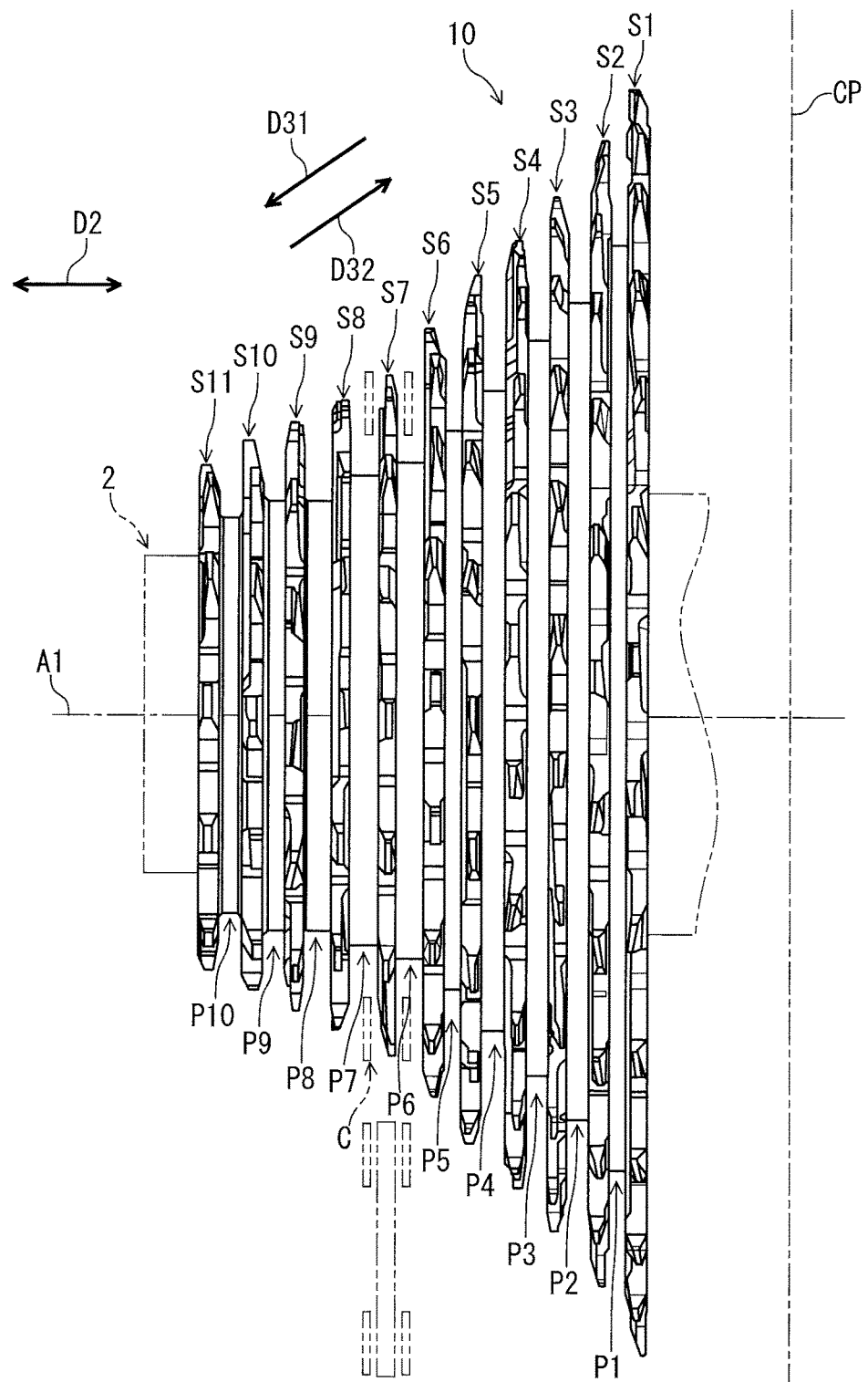
FIG. 2 is a front elevational view of the bicycle sprocket assembly.

As seen in FIG. 1, the bicycle sprocket assembly 10 further comprises a hub engagement structure 12 configured to engage with a bicycle hub assembly 2 (FIG. 2). While the bicycle sprocket assembly 10 is a bicycle rear sprocket assembly in the illustrated embodiment, the structure of the bicycle sprocket assembly 10 can be applied to a front sprocket assembly if needed and/or desired. Each of the bicycle sprockets S1 to S11 is a bicycle rear sprocket in this embodiment, and the structures of the bicycle sprockets S1 to S11 can be applied to a bicycle front sprocket.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 10 or the bicycle sprockets S1 to S11, should be interpreted relative to the bicycle equipped with the bicycle sprocket assembly 10 or the bicycle sprockets S1 to S11 as used in an upright riding position on a horizontal surface.

As seen in FIG. 2, the bicycle sprockets S1 to S11 are arranged in an axial direction D2 parallel to the rotational center axis A1. The bicycle sprockets S1 to S11 are spaced apart from each other in the axial direction D2. The bicycle sprocket assembly 10 includes spacers P1 to P10. Each of the spacers P1 to P10 is arranged between adjacent two sprockets of the bicycle sprockets S1 to S11. Instead of such spacers, a sprocket support member to which a plurality of bicycle sprockets are mounted can also be used.

The bicycle sprocket S1 has an outer diameter which is largest in the bicycle sprockets S1 to S11. The bicycle sprocket S11 has an outer diameter which is smallest in the bicycle sprockets S1 to S11. The bicycle sprocket S1 is closer to a bicycle center plane CP of a bicycle frame (not shown) than the bicycle sprocket S11 in a state where the bicycle sprocket assembly 10 is mounted to the bicycle hub assembly 2. For example, upshifting occurs when the bicycle chain C is shifted by a rear derailleur (not shown) from a larger sprocket to a neighboring smaller sprocket in an upshifting direction D31. Downshifting occurs when the bicycle chain C is shifted by the rear derailleur from a smaller sprocket to a neighboring larger sprocket in a downshifting direction D32.

The bicycle sprockets S1 to S11 have substantially the same structure as each other. The bicycle sprockets S4 and S5 will be described in detail below, and other bicycle sprockets will not be described in detail here for the sake of brevity. In this embodiment, the bicycle sprocket S5 can also be referred to as a first sprocket S5, and the bicycle sprocket S4 can also be referred to as a second sprocket S4. Namely, the bicycle sprocket assembly 10 comprises the first sprocket S5 and the second sprocket S4. As seen in FIG. 2, the second sprocket S4 is adjacent to the first sprocket S5 in the axial direction D2 parallel to the rotational center axis A1 without another sprocket between the first sprocket S5 and the second sprocket S4.

Figure 3:
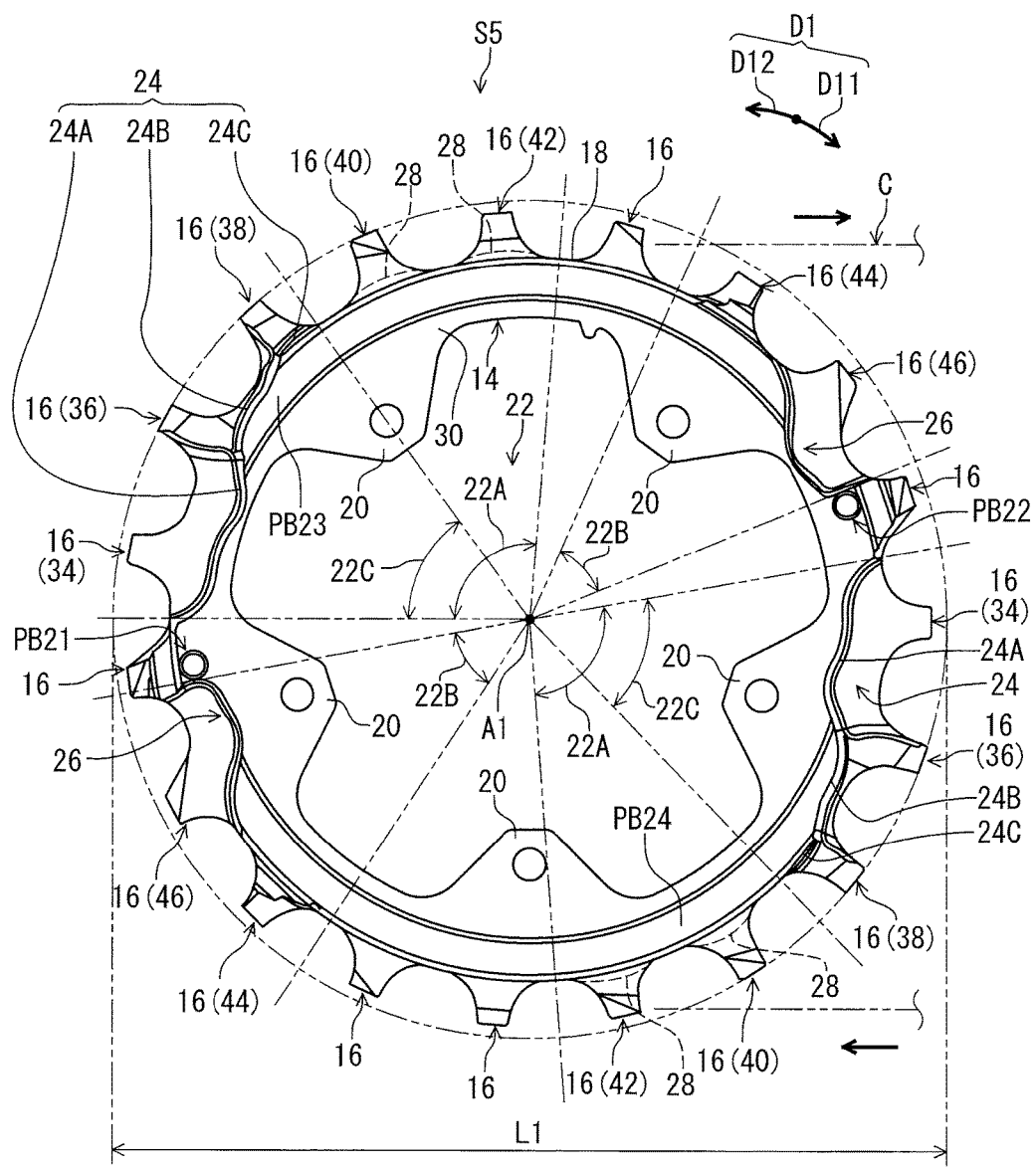
FIG. 3 is a side elevational view of a first sprocket of the bicycle sprocket assembly.
Figure 4:
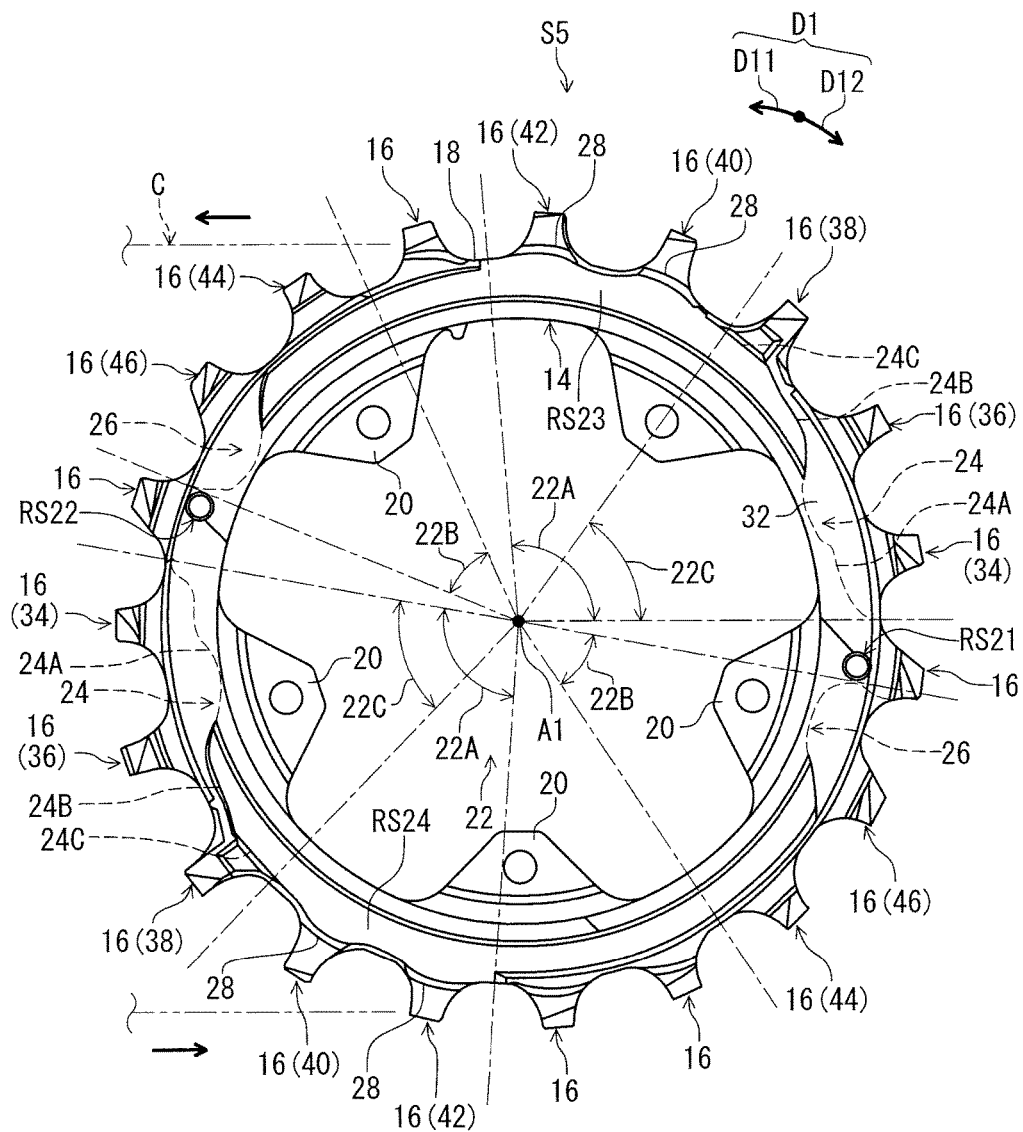
FIG. 4 is another side elevational view of the first sprocket.

As seen in FIGS. 3 and 4, the first sprocket S5 comprises a first sprocket body 14 and a plurality of first chain-driving teeth 16. The first sprocket body 14 includes a first radially outer periphery 18 provided about the rotational center axis A1 of the bicycle sprocket assembly 10. The plurality of first chain-driving teeth 16 are provided on the first radially outer periphery 18 to engage with the bicycle chain C. The first sprocket body 14 is configured to be rotatable about the rotational center axis A1. The first sprocket body 14 has an annular shape. The plurality of first chain-driving teeth 16 extend radially outward from the first radially outer periphery 18 of the first sprocket body 14. As seen in FIG. 3, the first sprocket S5 comprises a first outer diameter L1 defined by the plurality of first chain-driving teeth 16. In this embodiment, the first outer diameter L1 is defined as a maximum outer diameter of the first sprocket S5.

As seen in FIGS. 3 and 4, the first sprocket S5 includes first securing parts 20 extending radially inward from an inner periphery of the first sprocket body 14. The first securing parts 20 are spaced apart from each other in the circumferential direction D1. The first sprocket S5 is secured to a sprocket support member (not shown) via the first securing parts 20.

As seen in FIG. 3, the first sprocket S5 comprises a first shifting facilitation area 22 to facilitate a shifting operation of the bicycle chain C. In this embodiment, the first shifting facilitation area 22 includes a first upshifting facilitation area 22A to facilitate an upshifting operation of the bicycle chain C and a first downshifting facilitation area 22B to facilitate a downshifting operation of the bicycle chain C. Specifically, the first shifting facilitation area 22 includes first upshifting facilitation areas 22A and first downshifting facilitation areas 22B. However, a total number of each of the first upshifting facilitation areas 22A and the first downshifting facilitation areas 22B is not limited to this embodiment.

As seen in FIG. 3, the first sprocket S5 further comprises a first shifting facilitation recess 24 to facilitate the shifting operation of the bicycle chain C. The first shifting facilitation recess 24 is provided in the first shifting facilitation area 22. In this embodiment, the first sprocket S5 comprises first shifting facilitation recesses 24. However, a total number of the first shifting facilitation recesses 24 is not limited to this embodiment.

The first shifting facilitation recess 24 is provided in the first shifting facilitation area 22 to facilitate the upshifting operation of the bicycle chain C. The first shifting facilitation recess 24 is provided in the first upshifting facilitation area 22A. The first shifting facilitation recess 24 is configured to reduce interference between the bicycle sprocket S5 and the bicycle chain C in the upshifting operation. The first shifting facilitation recess 24 can also be referred to as a first upshifting facilitation recess 24.

Figure 5:
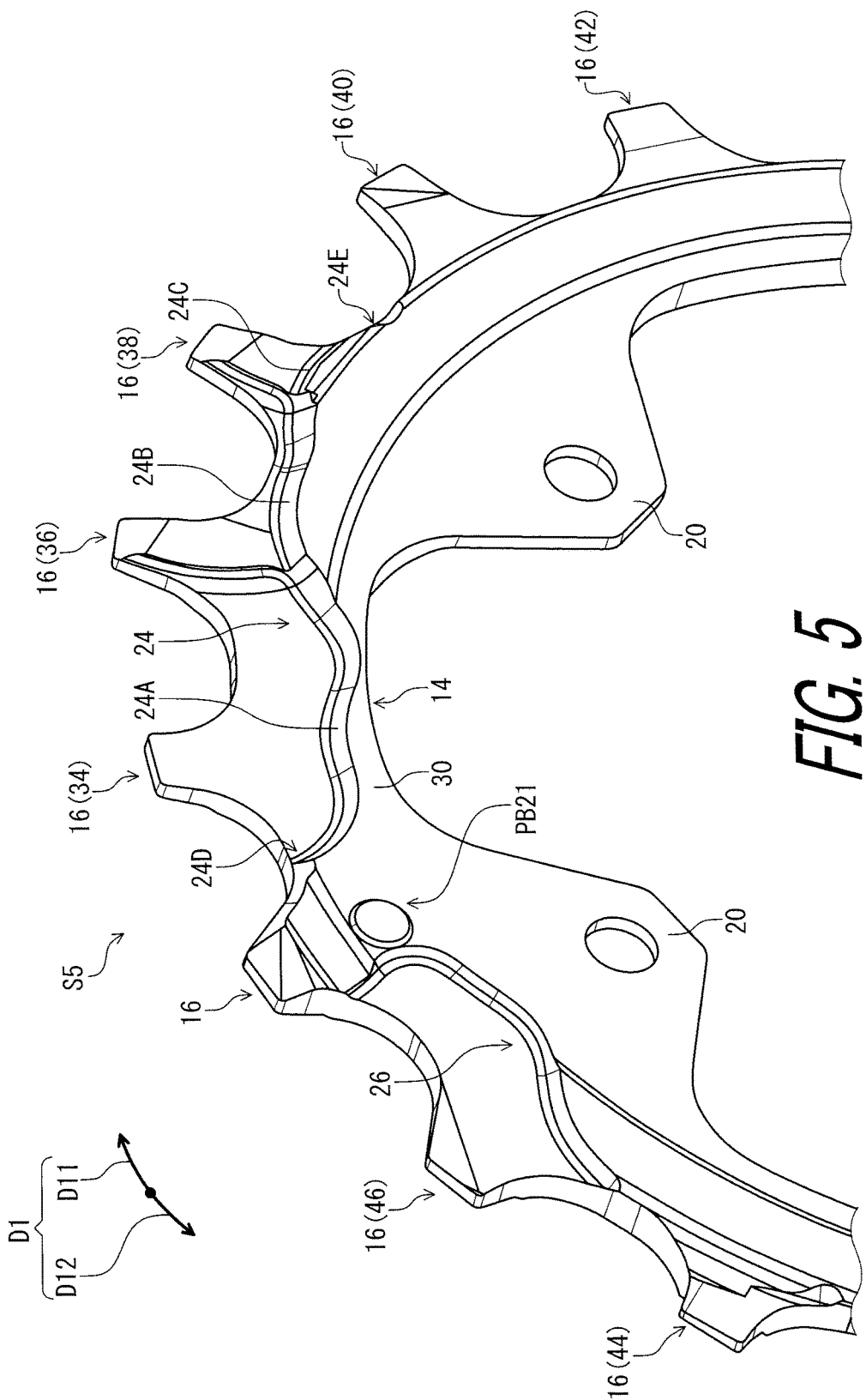
FIG. 5 is a partial perspective view of the first sprocket.

As seen in FIG. 5, the first shifting facilitation recess 24 includes a first upshifting recess 24A, a second upshifting recess 24B, and a third upshifting recess 24C. The first upshifting recess 24A is provided on an upstream side of the second upshifting recess 24B in the driving rotational direction D11. The second upshifting recess 24B is provided on an upstream side of the third upshifting recess 24C in the driving rotational direction D11. The second upshifting recess 24B is provided between the first upshifting recess 24A and the third upshifting recess 24C in the circumferential direction D1. The first to third upshifting recesses 24A to 24C are continuously provided in the circumferential direction D1. However, the shape of the first shifting facilitation recess 24 is not limited to this embodiment.

The first shifting facilitation recess 24 includes a first circumferential end 24D and a second circumferential end 24E. The first shifting facilitation recess 24 extends between the first circumferential end 24D and the second circumferential end 24E in the circumferential direction D1. The first shifting facilitation recess 24 continuously extends from the first circumferential end 24D to the second circumferential end 24E in the driving rotational direction D11.

As seen in FIGS. 3 and 5, the first sprocket S5 comprises a first shifting facilitation recess 26 to facilitate the shifting operation. In this embodiment, the first sprocket S5 comprises first shifting facilitation recesses 26 to facilitate the downshifting operation. The first shifting facilitation recess 26 is configured to reduce interference between the first sprocket S5 and the bicycle chain C in the downshifting operation. However, a total number of the first shifting facilitation recesses 26 is not limited to this embodiment.

As seen in FIG. 3, the first shifting facilitation recess 26 is provided in the first shifting facilitation area 22 to facilitate the downshifting operation of the bicycle chain C. The first shifting facilitation recess 26 is provided in the first downshifting facilitation area 22B. The first shifting facilitation recess 26 can also be referred to as a first downshifting facilitation recess 26. The first shifting facilitation recess 26 can be omitted from the first shifting facilitation area 22.

Figure 6:
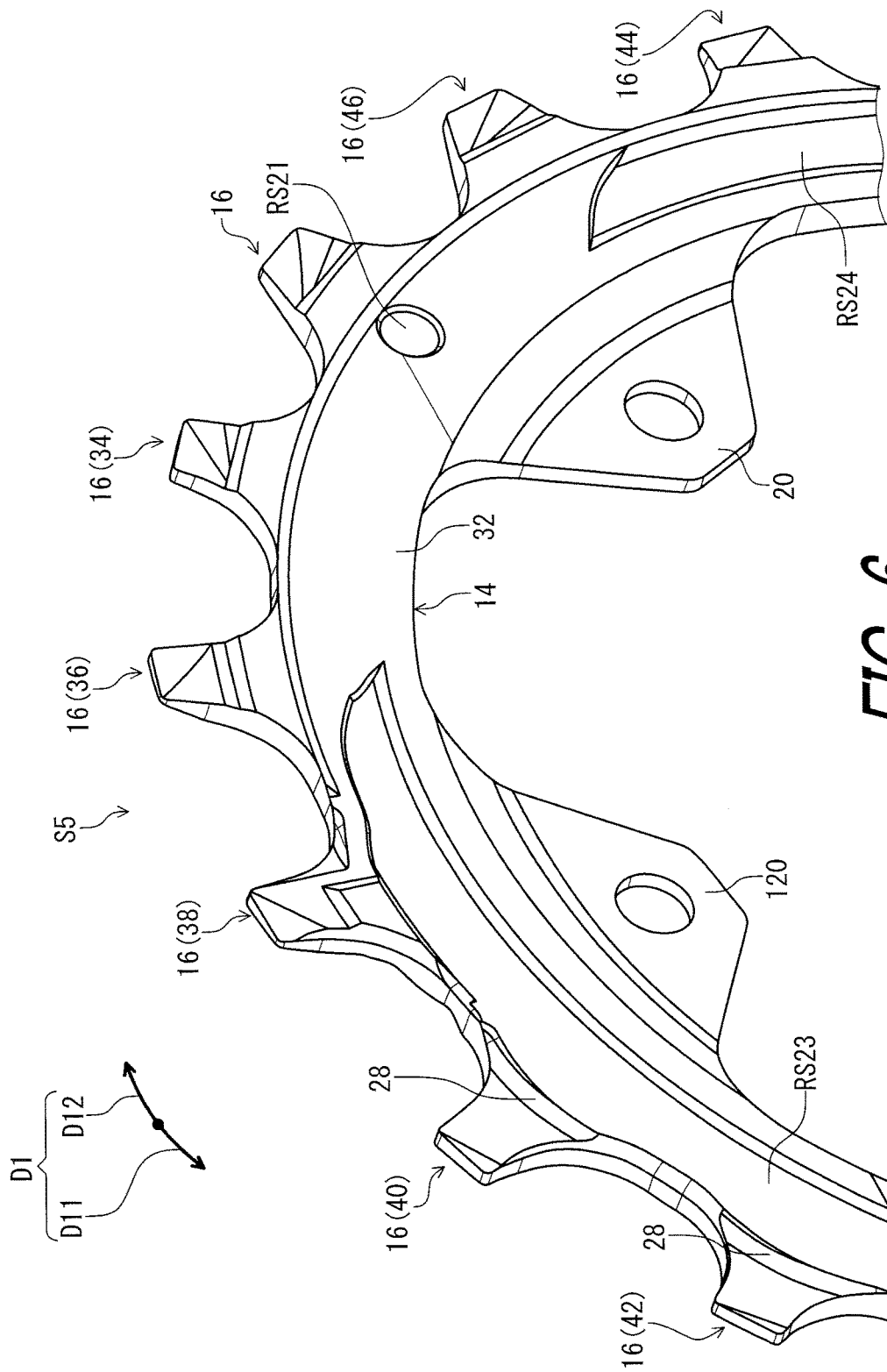
FIG. 6 is another partial perspective view of the first sprocket.

As seen in FIGS. 4 and 6, the first sprocket S5 comprises a first additional shifting facilitation recess 28 to facilitate the shifting operation. In this embodiment, the first sprocket S5 comprises first additional shifting facilitation recesses 28 to facilitate the upshifting operation. The first additional shifting facilitation recess 28 is configured to facilitate an axial movement of the bicycle chain C relative to the first sprocket S5 to smoothly disengage the bicycle chain C from the first sprocket S5 in the upshifting operation. However, a total number of the first additional shifting facilitation recesses 28 is not limited to this embodiment.

As seen in FIG. 4, the first additional shifting facilitation recess 28 is provided in the first shifting facilitation area 22 to facilitate the upshifting operation. The first additional shifting facilitation recess 28 is provided in the upshifting facilitation area 22A. The first additional shifting facilitation recess 28 are separately provided from each other in the circumferential direction D1. However, the shape of the first additional shifting facilitation recess 28 is not limited to this embodiment.

Figure 7:
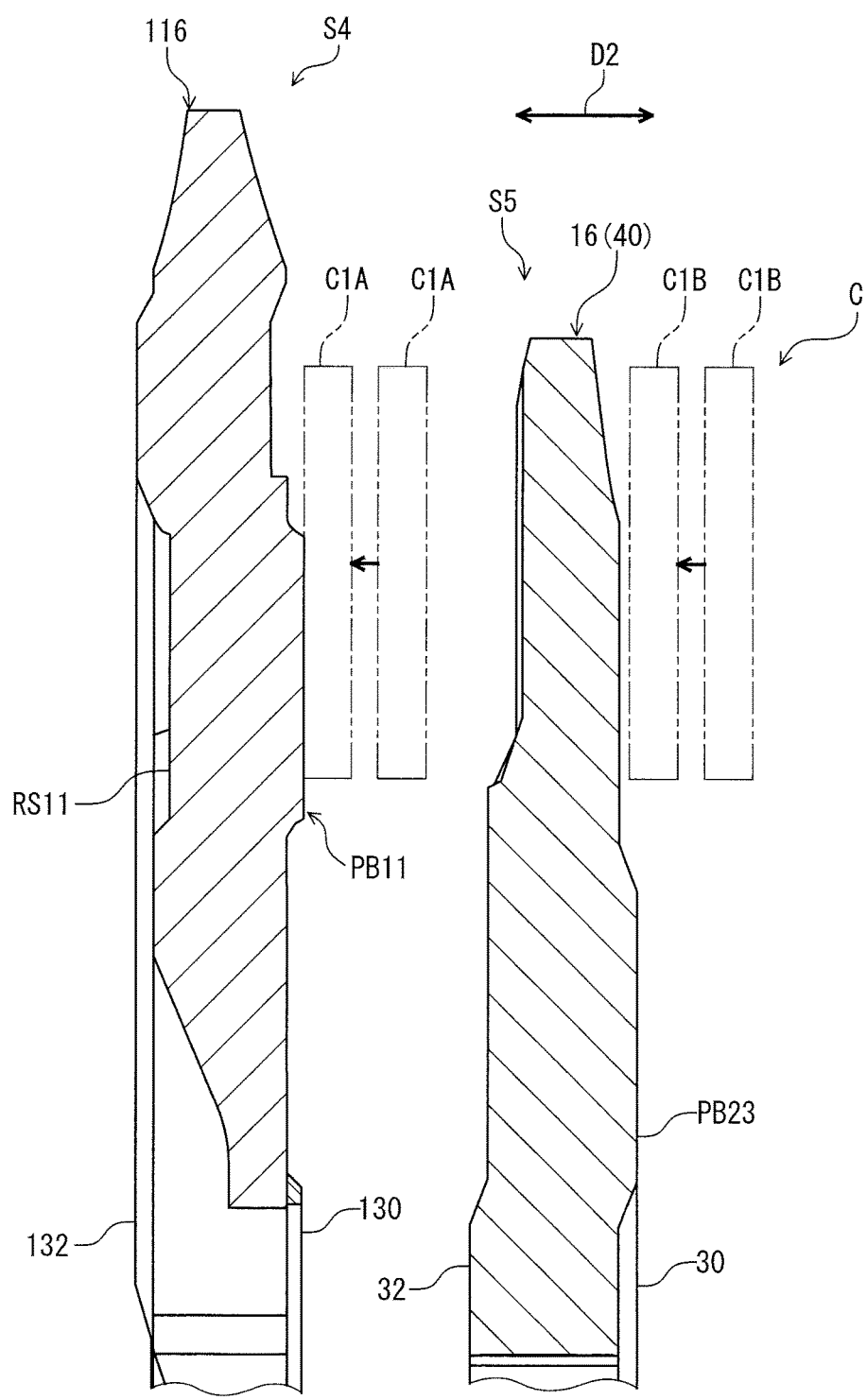
FIG. 7 is a partial cross-sectional view of the bicycle sprocket assembly.

As seen in FIG. 7, the first sprocket S5 comprises a first axial surface 30 and a first additional axial surface 32. The first additional axial surface 32 is provided on a reverse side of the first axial surface 30 in the axial direction D2. The first additional axial surface 32 faces toward the second sprocket S4. The first shifting facilitation recess 24 is disposed on the first axial surface 30. Specifically, the first shifting facilitation recesses 24 and 26 are disposed on the first axial surface 30. The first additional shifting facilitation recess 28 is disposed on the first additional axial surface 32.

As seen in FIG. 5, the plurality of first chain-driving teeth 16 include a first tooth 34, a second tooth 36, a third tooth 38, a fourth tooth 40, and a fifth tooth 42. The first tooth 34, the second tooth 36, the third tooth 38, the fourth tooth 40, and the fifth tooth 42 are circumferentially arranged in order. The first tooth 34, the second tooth 36, the third tooth 38, the fourth tooth 40, and the fifth tooth 42 are adjacent to each other without another tooth therebetween. The first tooth 34 is provided on an upstream side of the fifth tooth 42 in the driving rotational direction D11 in which the bicycle sprocket assembly 10 is rotated about the rotational center axis A1 during pedaling. In this embodiment, plurality of first chain-driving teeth 16 include first teeth 34, second teeth 36, third teeth 38, fourth teeth 40, and fifth teeth 42. However, a total number of each of the first to fifth teeth 34 to 42 is not limited to this embodiment.

As seen in FIG. 3, the first tooth 34 is provided in the first shifting facilitation area 22. The second tooth 36 is provided in the first shifting facilitation area 22. The third tooth 38 is provided in the first shifting facilitation area 22. The fourth tooth 40 is provided in the first shifting facilitation area 22. The fifth tooth 42 is provided in the first shifting facilitation area 22. In this embodiment, the first to fifth teeth 34 to 42 are provided in the first upshifting facilitation area 22A to facilitate the upshifting operation. The first to fifth teeth 34 to 42 can also be referred to as first to fifth upshifting facilitation teeth 34 to 42, respectively.

The first tooth 34 is provided in a circumferential recess area 22C defined between the first circumferential end 24D and the second circumferential end 24E in the circumferential direction D1. The second tooth 36 is provided in the circumferential recess area 22C. The third tooth 38 is provided in the circumferential recess area 22C. The fourth tooth 40 is provided outside the circumferential recess area 22C. The fifth tooth 42 is provided outside the circumferential recess area 22C. The arrangement of the first to fifth teeth 34 to 42 is not limited to this embodiment.

Figure 8:
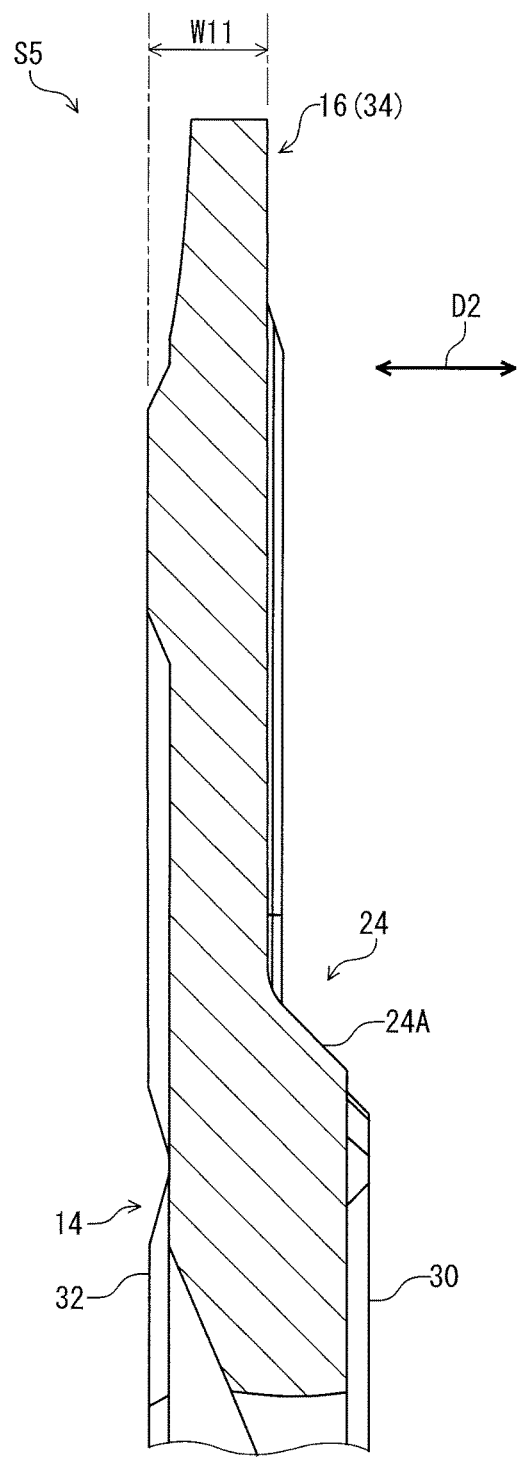
FIG. 8 is a partial cross-sectional view of the first sprocket.
Figure 9:
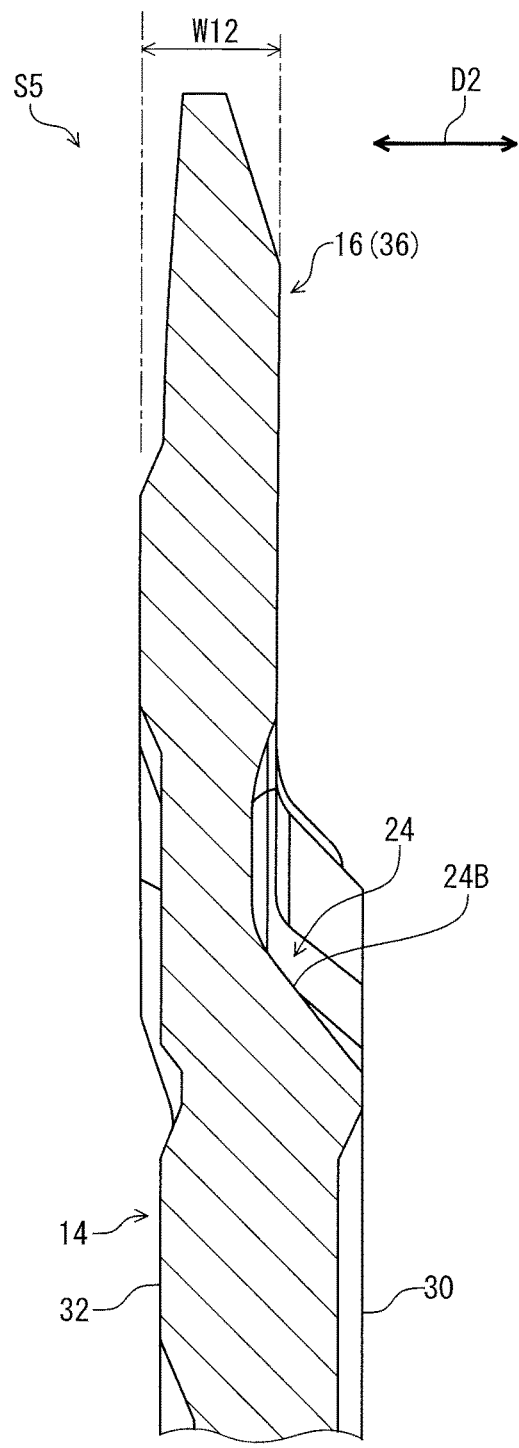
FIG. 9 is another partial cross-sectional view of the first sprocket.
Figure 10:
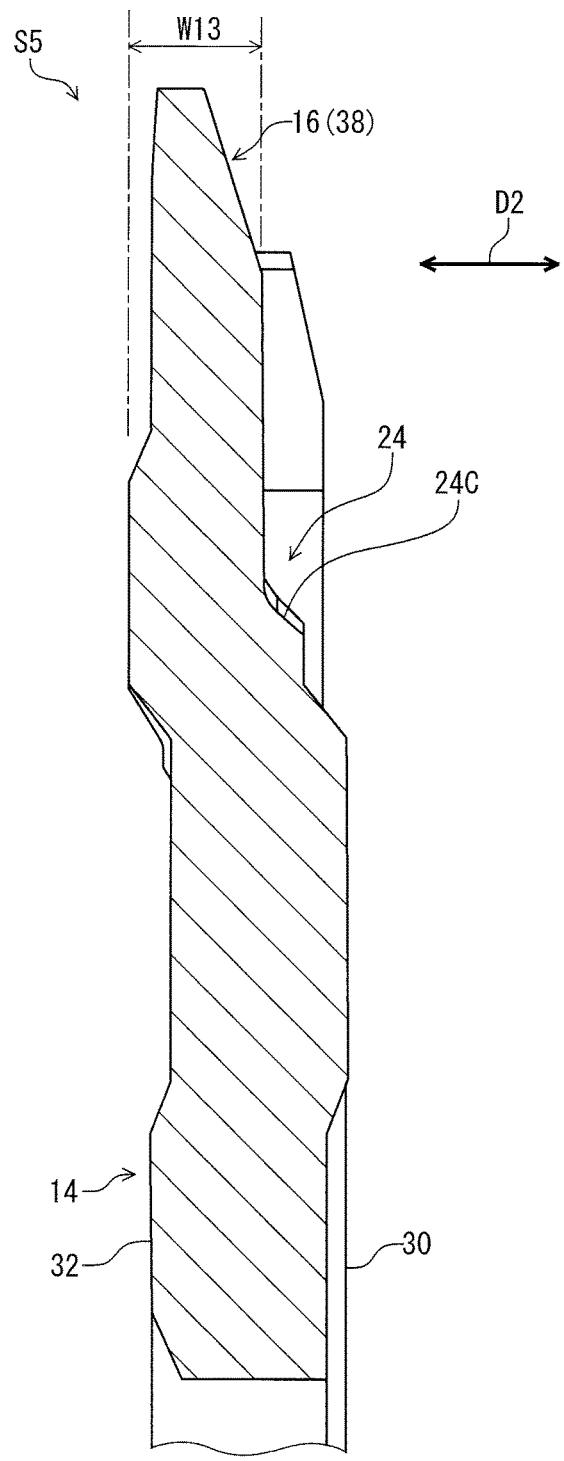
FIG. 10 is another partial cross-sectional view of the first sprocket.

As seen in FIGS. 8 to 10, the first tooth 34 has an axial chain-engaging width that is smallest among the first tooth 34, the second tooth 36, and the third tooth 38. As seen in FIG. 8, the first tooth 34 has a first axial chain-engaging width W11 defined in the axial direction D2. As seen in FIG. 9, the second tooth 36 has a second axial chain-engaging width W12 defined in the axial direction D2. As seen in FIG. 10, the third tooth 38 has a third axial chain-engaging width W13 defined in the axial direction D2. The first axial chain-engaging width W11 is smaller than the second axial chain-engaging width W12 and the third axial chain-engaging width W13. The second axial chain-engaging width W12 is smaller than the third axial chain-engaging width W13.

As seen in FIGS. 3 and 5, the plurality of chain-driving teeth 16 includes first downshifting facilitation teeth 44 and 46. The first downshifting facilitation tooth 44 firstly catches the bicycle chain C in the downshifting operation among the plurality of chain-driving teeth 16. As seen in FIG. 3, the first downshifting facilitation teeth 44 and 46 are provided in the first shifting facilitation area 22 to facilitate the downshifting operation. In this embodiment, the first downshifting facilitation teeth 44 and 46 are provided in the first downshifting facilitation area 22B. The first downshifting facilitation tooth 46 is provided in the first shifting facilitation recess 26. The first downshifting facilitation tooth 44 is provided outside the first shifting facilitation recess 26.

The first downshifting facilitation tooth 46 is disposed on a downstream side of the first downshifting facilitation tooth 44 and the first shifting facilitation recess 26 in the driving rotational direction D11. The first downshifting facilitation tooth 46 is adjacent to the first downshifting facilitation tooth 44 in the circumferential direction D1 without another tooth between the first downshifting facilitation teeth 44 and 46.

Figure 11:
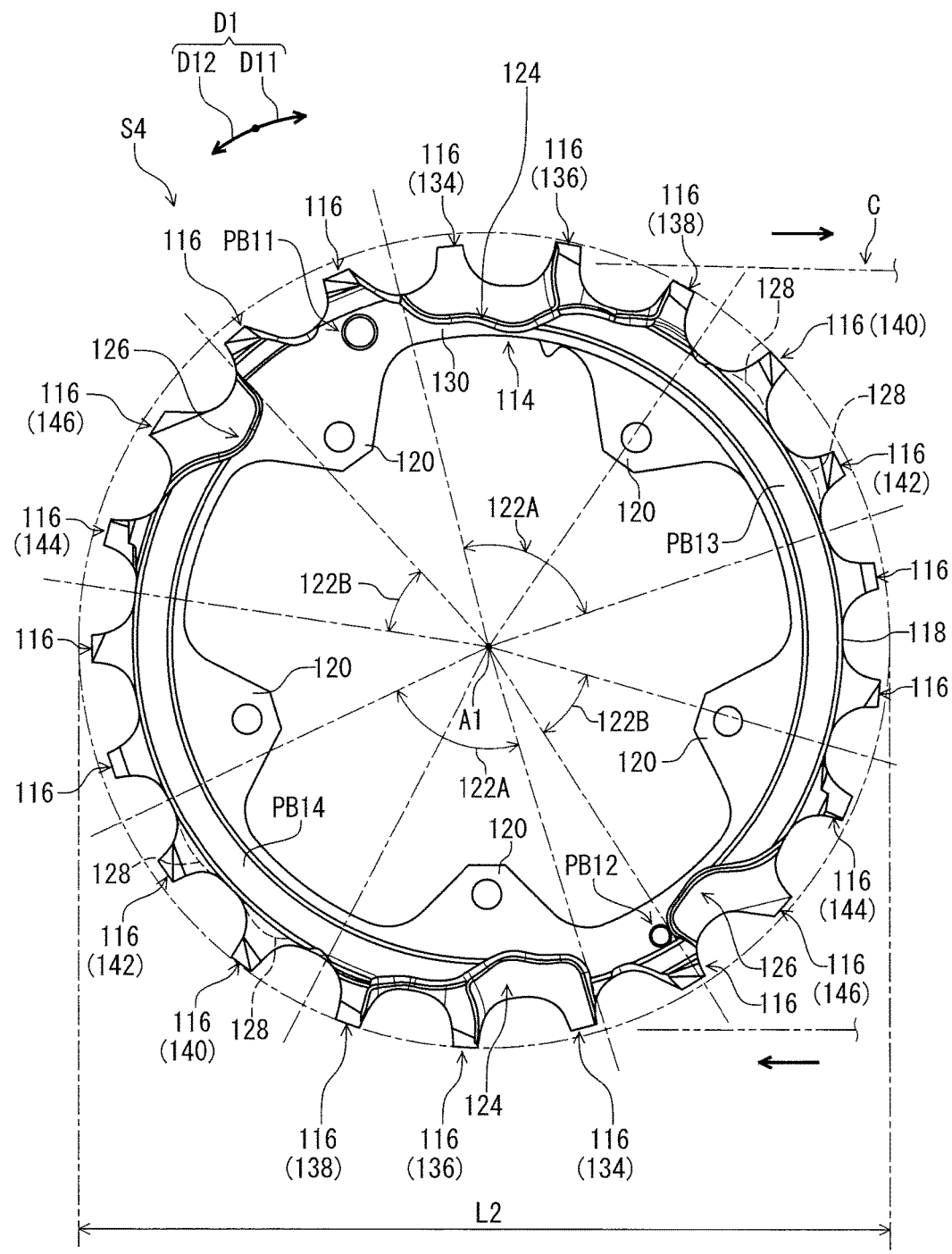
FIG. 11 is a side elevational view of a second sprocket of the bicycle sprocket assembly.
Figure 12:
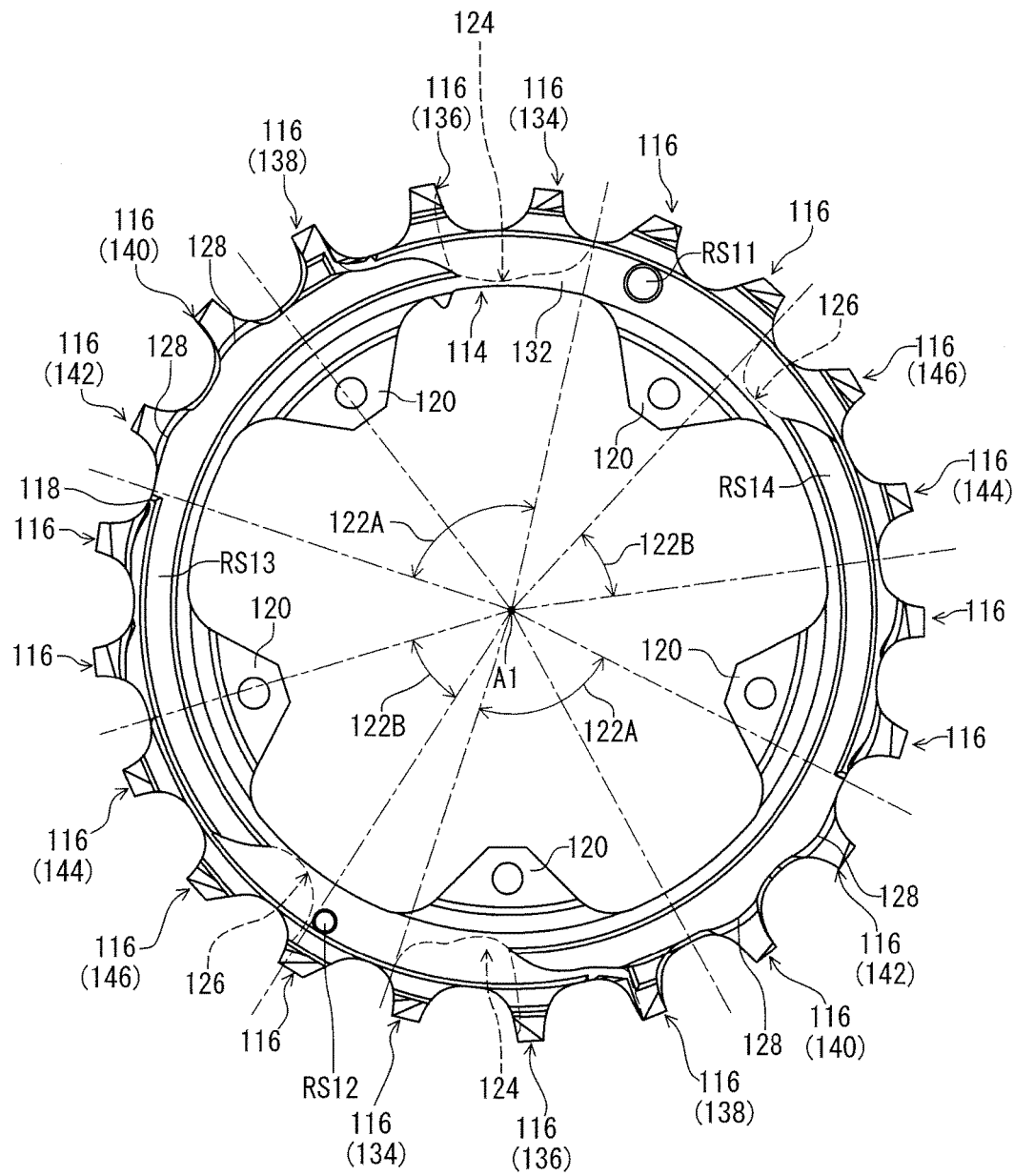
FIG. 12 is another side elevational view of the second sprocket.

As seen in FIGS. 11 and 12, the second sprocket S4 comprises a second sprocket body 114 and a plurality of second chain-driving teeth 116. The second sprocket body 114 includes a second radially outer periphery 118 provided about the rotational center axis A1 of the bicycle sprocket assembly 10. The plurality of second chain-driving teeth 116 are provided on the second radially outer periphery 118 to engage with the bicycle chain C. The second sprocket body 114 is configured to be rotatable about the rotational center axis A1. The second sprocket body 114 has an annular shape. The plurality of second chain-driving teeth 116 extend radially outward from the second radially outer periphery 118 of the second sprocket body 114. The second sprocket S4 comprises a second outer diameter L2 defined by the plurality of second chain-driving teeth 116. The second outer diameter L2 is larger than the first outer diameter L1. The second outer diameter L2 is defined as a maximum outer diameter of the second sprocket S4.

The second sprocket S4 includes second securing parts 120 extending radially inward from an inner periphery of the second sprocket body 114. The second securing parts 120 are spaced apart from each other in the circumferential direction D1. The second sprocket S4 is secured to a sprocket support member (not shown) via the second securing parts 120.

The second sprocket S4 has substantially the same structure as that of the first sprocket S5. For example, the second sprocket S4 comprises a second shifting facilitation area 122. The second shifting facilitation area 122 includes a second upshifting facilitation area 122A and a second downshifting facilitation area 122B. The second sprocket S4 comprises second shifting facilitation recesses 124 and 126 to facilitate the shifting operation of the bicycle chain C. The second shifting facilitation recess 124 is provided in the second upshifting facilitation area 122A to facilitate the upshifting operation. The second shifting facilitation recess 126 is provided in the second downshifting facilitation area 122B to facilitate the downshifting operation. The second sprocket S4 comprises second additional shifting facilitation recesses 128 to facilitate the shifting operation of the bicycle chain C. The second additional shifting facilitation recess 128 is provided in the second upshifting facilitation area 122A to facilitate the upshifting operation. The elements 122 to 128 have substantially the same structures as those of the elements 22 to 28 of the first sprocket S5, respectively. Thus, they will not be described in detail here for the sake of brevity.

As seen in FIG. 7, the second sprocket S4 comprises a second axial surface 130 and a second additional axial surface 132. The second axial surface 130 faces toward the first sprocket S5. The second additional axial surface 132 is provided on a reverse side of the second axial surface 130 in the axial direction D2. As seen in FIG. 11, the second shifting facilitation recesses 124 and 126 are provided on the second axial surface 130. As seen in FIG. 12, the second additional shifting facilitation recess 128 is provided on the second additional axial surface 132.

Figure 13:
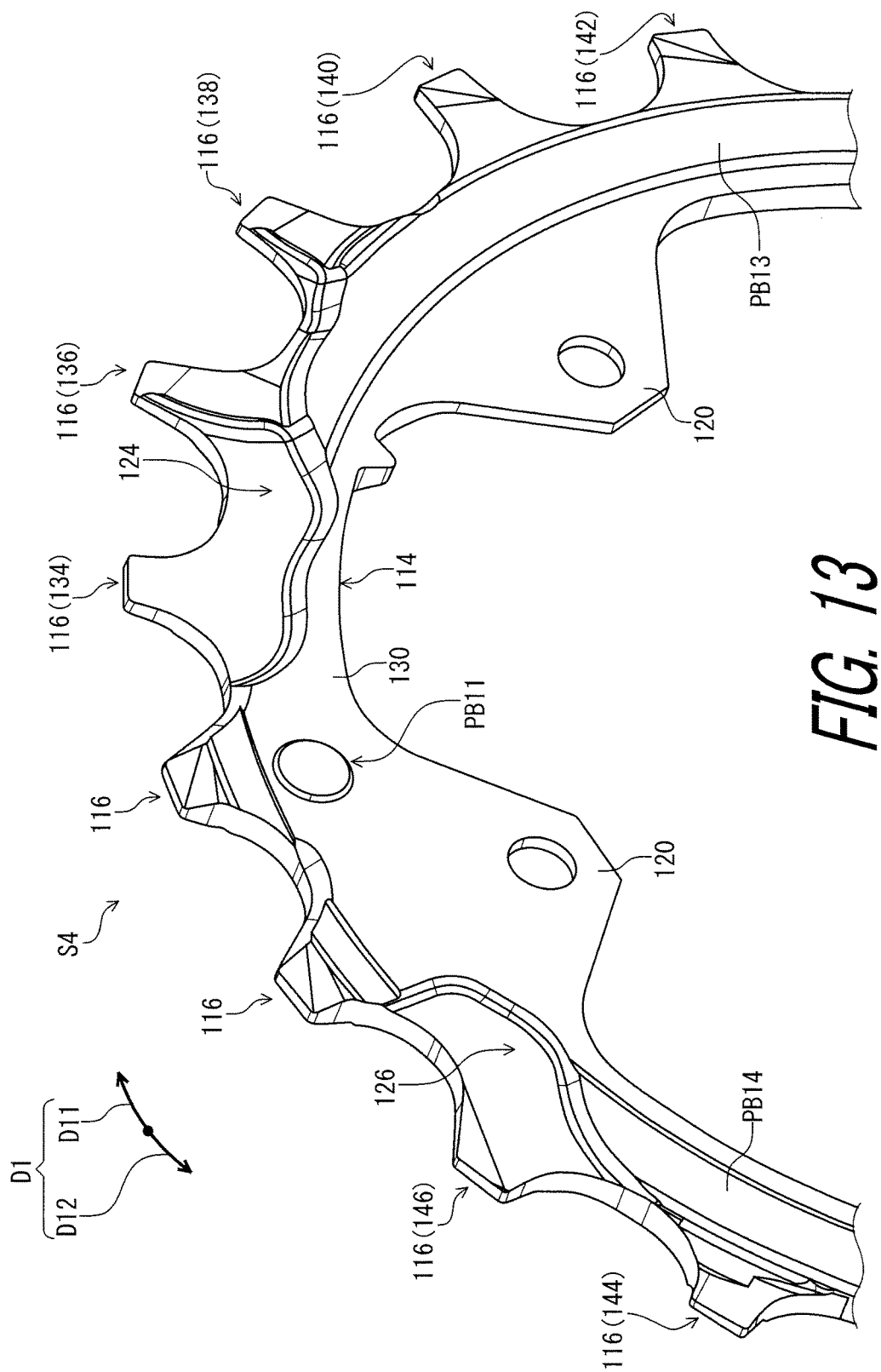
FIG. 13 is a partial perspective view of the second sprocket.
Figure 14:
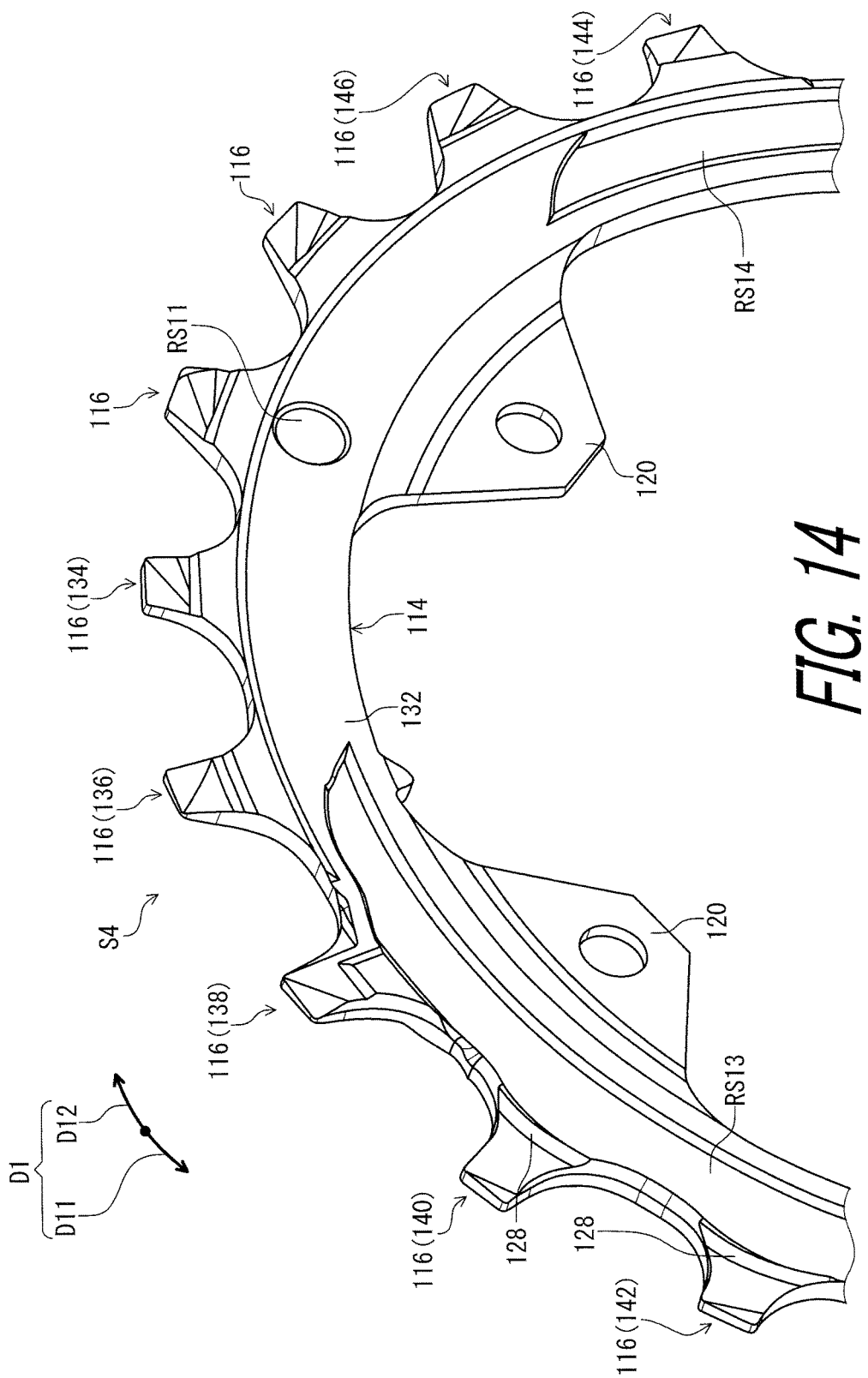
FIG. 14 is another partial perspective view of the second sprocket.

As seen in FIGS. 13 and 14, the plurality of second chain-driving teeth 116 include second upshifting facilitation teeth 134, 136, 138, 140, and 142. The plurality of second chain-driving teeth 116 include second downshifting facilitation teeth 144 and 146. The second upshifting facilitation teeth 134 to 142 have substantially the same structures as those of the first to fifth teeth 34 to 42 of the first sprocket S5, respectively. The second downshifting facilitation teeth 144 and 146 have substantially the same structures as those of the first downshifting facilitation teeth 44 and 46, respectively. Thus, they will not be described in detail here for the sake of brevity.

Figure 15:
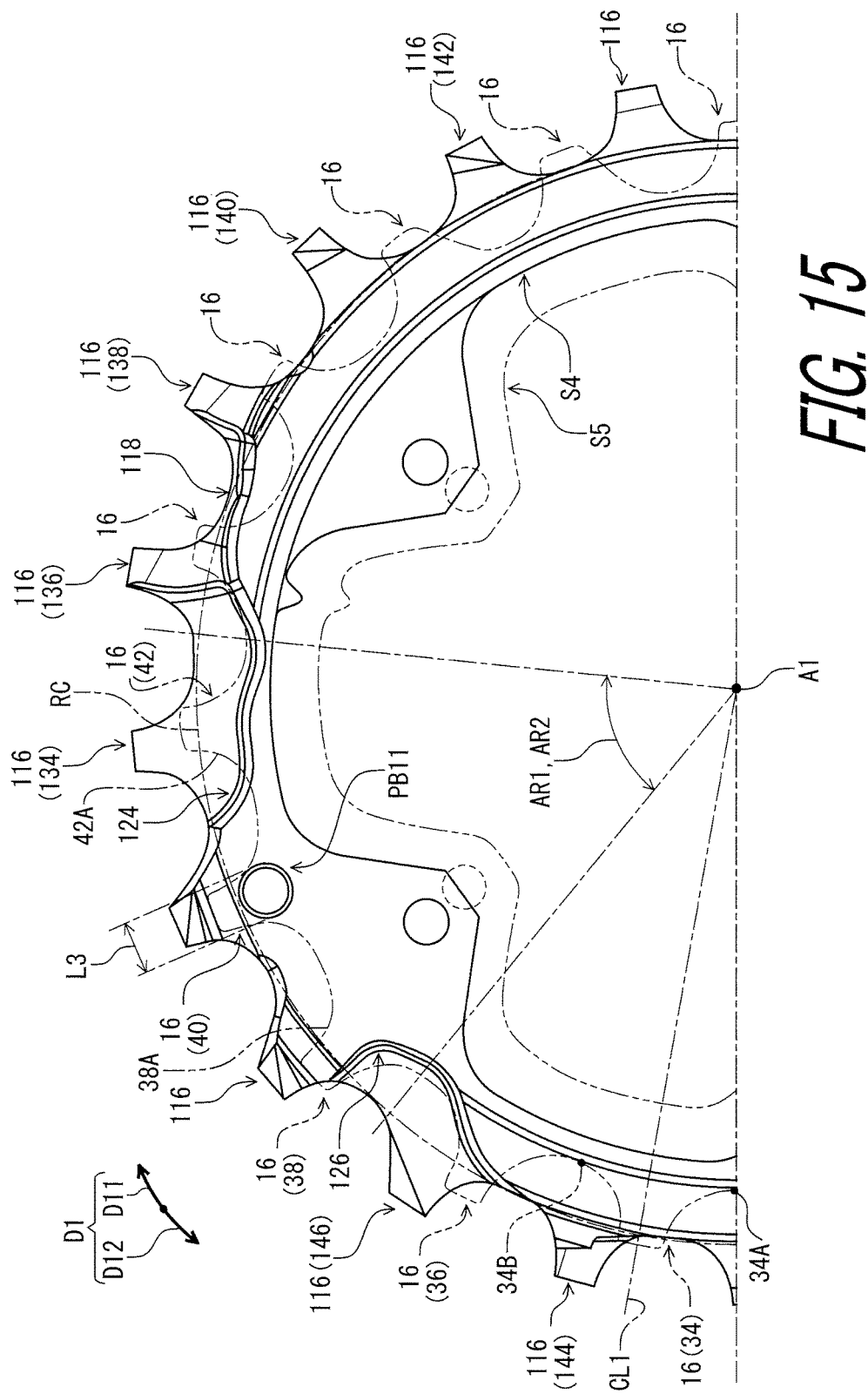
FIG. 15 is a partial side elevational view of the first sprocket and the second sprocket for showing a positional relationship therebetween.

As seen in FIG. 15, the second sprocket S4 comprises a support protuberance PB11 protruding from the second sprocket body 114 toward the first sprocket S5. The support protuberance PB11 is provided in a circumferential support area AR1 on the second sprocket S4. The circumferential support area AR1 is configured to face a circumferential area AR2 on the first sprocket S5 in the axial direction D2. The circumferential area AR2 extends from the third tooth 38 to the fifth tooth 42 in the circumferential direction D1 with respect to the rotational center axis A1. The circumferential support area AR1 overlaps with the circumferential area AR2 when viewed from the axial direction D2.

At least part of the support protuberance PB11 is positioned radially inward from a root circle RC of the second sprocket S4. In this embodiment, the root circle RC coincides with the second outer periphery of the second sprocket body 114. The root circle RC is defined by tooth bottoms of the second sprocket S4. The support protuberance PB11 is entirely positioned radially inward from the root circle RC of the second sprocket S4. However, the support protuberance PB11 can be partly positioned radially inward from the root circle RC of the second sprocket S4.

The support protuberance PB11 is disposed to overlap with the fourth tooth 40 when viewed from the axial direction D2. The fifth tooth 42 is closer to the support protuberance PB11 than the first tooth 34 in the circumferential direction D1. The fifth tooth 42 is closer to the support protuberance PB11 than the second tooth 36 in the circumferential direction D1.

The support protuberance PB11 is provided between adjacent two recesses of the second shifting facilitation recesses 124 and 126 in the circumferential direction D1. In this embodiment, the support protuberance PB11 is provided between the second shifting facilitation recesses 124 and 126 in the circumferential direction D1. The second shifting facilitation recess 124 is closer to the support protuberance PB11 than the second shifting facilitation recess 126 in the circumferential direction D1. However, the positional relationship among the support protuberance PB11 and the second shifting facilitation recesses 124 and 126 is not limited to this embodiment.

The support protuberance PB11 has a circular outline when viewed from the axial direction D2. However, the shape of the support protuberance PB11 is not limited to this embodiment. The support protuberance PB11 has a circumferential protuberance-length L3 that is equal to or smaller than a circumferential distance defined between a non-driving surface 38A of the third tooth 38 and a driving surface 42A of the fifth tooth 42 in the circumferential direction D1. The non-driving surface 38A is disposed to face the fourth tooth 40 in the driving rotational direction D11. The driving surface 42A is disposed to face the fourth tooth 40 in the reversing rotational direction D12.

As seen in FIG. 7, the support protuberance PB11 is configured to axially face one of an opposed pair of outer link plates C1A and C1B of the bicycle chain C in a state where the opposed pair of outer link plates C1A and C1B of the bicycle chain C engage with the fourth tooth 40. The second sprocket S4 includes a recess RS11 provided on a reverse side of the support protuberance PB11. In this embodiment, the recess RS11 is provided on the second additional axial surface 132. For example, the support protuberance PB11 and the recess RS11 are formed with the axial press working.

As seen in FIGS. 11 and 12, the second sprocket S4 comprises a support protuberance PB12 and a recess RS12. The support protuberance PB12 has substantially the same structure as that of the support protuberance PB11. The recess RS12 has substantially the same structure as that of the recess RS11. Thus, it will not be described in detail here for the sake of brevity.

Figure 16:
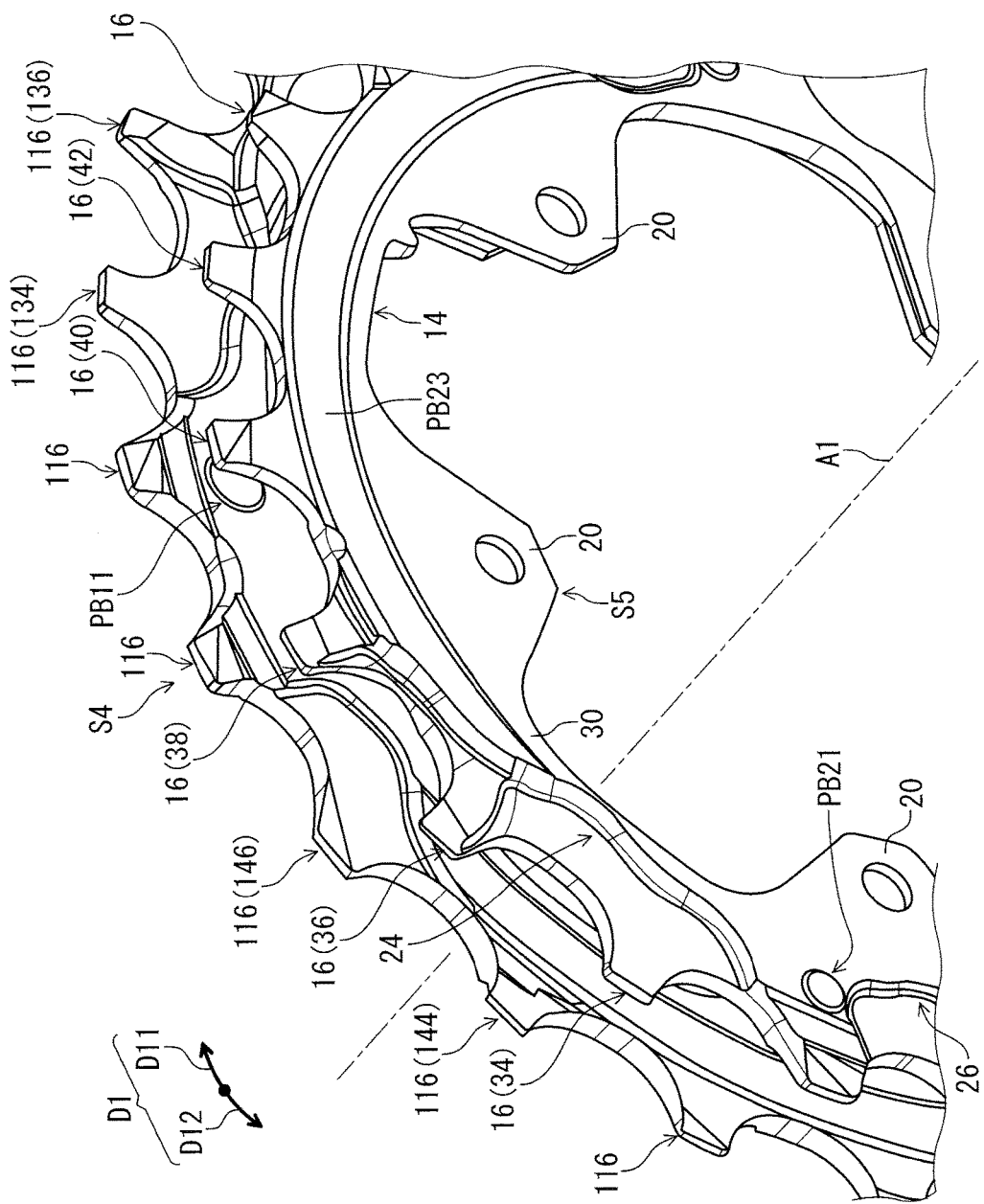
FIG. 16 is a partial perspective view of the first sprocket and the second sprocket for showing the positional relationship therebetween.

As seen in FIG. 16, the first sprocket S5 comprises an additional support protuberance PB21 protruding from the first sprocket body 14 away from the second sprocket S4. The additional support protuberance PB21 is closer to the first tooth 34 than the support protuberance PB11 in the circumferential direction D1. As seen in FIG. 3, the additional support protuberance PB21 is provided outside the first shifting facilitation area 22 when viewed from the axial direction D2.

As seen in FIG. 4, the first sprocket S5 includes a recess RS21 provided on a reverse side of the additional support protuberance PB21. In this embodiment, the recess RS21 is provided on the first additional axial surface 32. For example, the additional support protuberance PB21 and the recess RS21 are formed with the axial press working.

As seen in FIGS. 3 and 4, the first sprocket S5 comprises an additional support protuberance PB22 and a recess RS22. The additional support protuberance PB22 has substantially the same structure as that of the additional support protuberance PB21. The recess RS22 has substantially the same structure as that of the recess RS21. Thus, it will not be described in detail here for the sake of brevity.

As seen in FIG. 15, the support protuberance PB11 is positioned in a downstream side with respect to the first tooth 34 in the driving rotational direction D11 in which the bicycle sprocket assembly 10 is rotated about the rotational center axis A1 during pedaling. The support protuberance PB11 is spaced apart from a circumferential tooth center line CL1 of the first tooth 34 at least by 6 mm in the circumferential direction D1 with respect to the rotational center axis A1. The support protuberance PB11 is spaced apart from the circumferential tooth center line CL1 of the first tooth 34 at least by 30 mm in the circumferential direction D1. Preferably, the support protuberance PB11 is spaced apart from the circumferential tooth center line CL1 of the first tooth 34 at most by 45 mm in the circumferential direction D1. More preferably, the support protuberance PB11 is spaced apart from the circumferential tooth center line CL1 of the first tooth 34 at most by 70 mm in the circumferential direction D1. A circumferential distance is defined from the circumferential tooth center line CL1 of the first tooth 34 to the support protuberance PB11 along an arc line defined in the circumferential direction D1. The circumferential tooth center line CL1 of the first tooth 34 is defined at a circumferential center position between both tooth bottoms 34A and 34B of the first tooth 34.

In this embodiment, the support protuberance PB11 can be spaced apart from the circumferential tooth center line CL1 of the first tooth 34 at least by approximately 6 mm in the circumferential direction D1 with respect to the rotational center axis A1. The support protuberance PB11 can be spaced apart from the circumferential tooth center line CL1 of the first tooth 34 at least by approximately 30 mm in the circumferential direction D1. The support protuberance PB11 can be spaced apart from the circumferential tooth center line CL1 of the first tooth 34 at most by approximately 45 mm in the circumferential direction D1. The support protuberance PB11 can be spaced apart from the circumferential tooth center line CL1 of the first tooth 34 at most by approximately 70 mm in the circumferential direction D1.

As seen in FIG. 11, the second sprocket S4 comprises second support protuberances PB13 and PB14 to axially support the bicycle chain C in a state where the bicycle chain C engages with the first sprocket S5. The second support protuberances PB13 and PB14 protrude from the second sprocket body 114 toward the first sprocket S5 as well as the support protuberances PB11. The second support protuberances PB13 and PB14 extend in the circumferential direction D1 and have an arc shape when viewed from the axial direction D2. The second support protuberance PB13 extends from one of the second shifting facilitation recesses 124 to one of the second shifting facilitation recesses 126. The second support protuberance PB14 extends from the other of the second shifting facilitation recesses 124 to the other of the second shifting facilitation recesses 126. The circumferential protuberance-length L3 (FIG. 15) of the support protuberance PB11 is smaller than circumferential lengths of the second support protuberances PB13 and PB14.

As seen in FIG. 12, the second sprocket S4 includes recesses RS13 and RS14 provided on a reverse side of the second support protuberances PB13 and PB14. In this embodiment, the recesses RS13 and RS14 are provided on the second additional axial surface 132. For example, the second support protuberance PB13 and the recess RS13 are formed with the axial press working. The second support protuberance PB14 and the recess RS14 are formed with the axial press working.

As seen in FIG. 3, the first sprocket S5 comprises first support protuberances PB23 and PB24 to axially support the bicycle chain C in a state where the bicycle chain C engages with the bicycle sprocket S6 (FIG. 2). The first support protuberances PB23 and PB24 protrude from the first sprocket body 14 toward the bicycle sprocket S6 as well as the additional support protuberances PB21. The first support protuberances PB23 and PB24 extend in the circumferential direction D1 and have an arc shape when viewed from the axial direction D2. The first support protuberance PB23 extends from one of the first shifting facilitation recesses 24 to one of the first shifting facilitation recesses 26. The first support protuberance PB24 extends from the other of the first shifting facilitation recesses 24 to the other of the first shifting facilitation recesses 26. The circumferential protuberance-length L3 (FIG. 15) of the additional support protuberance PB21 is smaller than circumferential lengths of the first support protuberances PB23 and PB24.

As seen in FIG. 4, the first sprocket S5 includes recesses RS23 and RS24 provided on a reverse side of the first support protuberances PB23 and PB24. In this embodiment, the recesses RS23 and RS24 are provided on the first additional axial surface 32. For example, the first support protuberance PB23 and the recess RS23 are formed with the axial press working. The first support protuberance PB24 and the recess RS24 are formed with the axial press working.

With the bicycle sprocket assembly 10, as seen in FIG. 15, the support protuberance PB11 is provided in the circumferential support area AR1 on the second sprocket S4. Thus, the support protuberance PB11 axially supports the bicycle chain C when the bicycle chain C is engaged with the first sprocket S5. Accordingly, it is possible to improve the chain-holding performance of the bicycle sprocket assembly 10 in the first shifting facilitation area 22 of the first sprocket S5 when the bicycle chain C is engaged with the first sprocket S5.

For example, an opposed pair of inner link plates of the bicycle chain C are engaged with the first tooth 34 in a state where the opposed pair of outer link plates C1A and C1B (FIG. 7) of the bicycle chain C are engaged with the fourth tooth 40. In this state, the bicycle chain C is likely to be inclined relative to the first sprocket S5 around first to fifth teeth 34 to 42 since the first tooth 34 has the first axial chain-engaging width W11 (FIG. 8) smaller than the second axial chain-engaging width W12 (FIG. 9) and the third axial chain-engaging width W13 (FIG. 10). However, the support protuberance PB11 axially supports the outer link plate C1A (FIG. 7) of the bicycle chain C when the opposed pair of outer link plates C1A and C1B of the bicycle chain C is engaged with the fourth tooth 40. Thus, it is possible to control the inclination of the bicycle chain C, improving the chain-holding performance of the bicycle sprocket assembly 10.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket assembly comprising:
    a first sprocket comprising:
        a first sprocket body including a first radially outer periphery provided about a rotational center axis of the bicycle sprocket assembly;
        a first shifting facilitation area to facilitate a shifting operation of a bicycle chain;
        a plurality of first chain-driving teeth provided on the first radially outer periphery to engage with the bicycle chain, the plurality of first chain-driving teeth including a first tooth, a second tooth, a third tooth, a fourth tooth, and a fifth tooth which are circumferentially arranged in order and which are adjacent to each other without another tooth therebetween, the first tooth being provided in the first shifting facilitation area and provided on an upstream side of the fifth tooth in a driving rotational direction in which the bicycle sprocket assembly is rotated about the rotational center axis during pedaling; and
        a first outer diameter defined by the plurality of first chain-driving teeth; and
    a second sprocket adjacent to the first sprocket in an axial direction parallel to the rotational center axis without another sprocket between the first sprocket and the second sprocket, the second sprocket comprising:
        a second sprocket body including a second radially outer periphery provided about the rotational center axis of the bicycle sprocket assembly;
        a plurality of second chain-driving teeth provided on the second radially outer periphery to engage with the bicycle chain;
        a second outer diameter defined by the plurality of second chain-driving teeth, the second outer diameter being larger than the first outer diameter; and
        a support protuberance protruding axially, with respect to a radially central portion of the second sprocket body, toward the first sprocket, the radially central portion being disposed between the support protuberance and the rotational center axis, the support protuberance being provided in a circumferential support area on the second sprocket, the circumferential support area being configured to face a circumferential area on the first sprocket in the axial direction, the circumferential area extending from the third tooth to the fifth tooth in a circumferential direction with respect to the rotational center axis.

2. The bicycle sprocket assembly according to claim 1, wherein
    the support protuberance is configured to axially face one of an opposed pair of outer link plates of the bicycle chain in a state where the opposed pair of outer link plates of the bicycle chain engage with the fourth tooth.

3. The bicycle sprocket assembly according to claim 1, wherein
the support protuberance has a circumferential protuberance-length that is equal to or smaller than a circumferential distance defined between a non-driving surface of the third tooth and a driving surface of the fifth tooth in the circumferential direction.

4. The bicycle sprocket assembly according to claim 1, wherein
at least part of the support protuberance is positioned radially inward from a root circle of the second sprocket.

5. The bicycle sprocket assembly according to claim 1, wherein
the first tooth has an axial chain-engaging width that is smallest among the first tooth, the second tooth, and the third tooth.

6. The bicycle sprocket assembly according to claim 1, wherein
the fifth tooth is closer to the support protuberance than the first tooth in the circumferential direction.

7. The bicycle sprocket assembly according to claim 1, wherein
the fifth tooth is closer to the support protuberance than the second tooth in the circumferential direction.

8. The bicycle sprocket assembly according to claim 1, wherein
the support protuberance is disposed to overlap with the fourth tooth when viewed from the axial direction.

9. The bicycle sprocket assembly according to claim 1, wherein
the second tooth is provided in the first shifting facilitation area.

10. The bicycle sprocket assembly according to claim 1, wherein
the third tooth is provided in the first shifting facilitation area.

11. The bicycle sprocket assembly according to claim 1, wherein
the fourth tooth is provided in the first shifting facilitation area.

12. The bicycle sprocket assembly according to claim 1, wherein
the fifth tooth is provided in the first shifting facilitation area.

13. The bicycle sprocket assembly according to claim 1, further comprising:
a first shifting facilitation recess to facilitate the shifting operation of the bicycle chain, wherein
the first sprocket comprises a first axial surface and a first additional axial surface provided on a reverse side of the first axial surface in the axial direction,
the first additional axial surface faces toward the second sprocket, and
the first shifting facilitation recess is provided in the first shifting facilitation area and is disposed on the first axial surface.

14. The bicycle sprocket assembly according to claim 13, wherein
the first shifting facilitation recess includes a first circumferential end and a second circumferential end, the first shifting facilitation recess extending between the first circumferential end and the second circumferential end in the circumferential direction, and
the first tooth is provided in a circumferential recess area defined between the first circumferential end and the second circumferential end in the circumferential direction.

15. The bicycle sprocket assembly according to claim 14, wherein
the second tooth is provided in the circumferential recess area.

16. The bicycle sprocket assembly according to claim 14, wherein
the third tooth is provided in the circumferential recess area.

17. The bicycle sprocket assembly according to claim 14, wherein
the fourth tooth is provided outside the circumferential recess area.

18. The bicycle sprocket assembly according to claim 14, wherein
the fifth tooth is provided outside the circumferential recess area.

19. The bicycle sprocket assembly according to claim 1, wherein
the support protuberance has a circular outline when viewed from the axial direction.

20. The bicycle sprocket assembly according to claim 1, wherein
the second sprocket comprises
a second axial surface facing toward the first sprocket,
a second additional axial surface provided on a reverse side of the second axial surface in the axial direction, and
second shifting facilitation recesses to facilitate the shifting operation of the bicycle chain, the second shifting facilitation recesses being provided on the second axial surface, and
the support protuberance is provided between adjacent two recesses of the second shifting facilitation recesses in the circumferential direction.

21. The bicycle sprocket assembly according to claim 1, wherein
the first sprocket comprises an additional support protuberance protruding from the first sprocket body away from the second sprocket.

22. The bicycle sprocket assembly according to claim 21, wherein
the additional support protuberance is closer to the first tooth than the support protuberance in the circumferential direction.

23. The bicycle sprocket assembly according to claim 21, wherein
the additional support protuberance is provided outside the first shifting facilitation area when viewed from the axial direction.

24. The bicycle sprocket assembly according to claim 1, wherein
the support protuberance is disposed to overlap with a tooth of the plurality of second chain-driving teeth in a radial direction.

25. The bicycle sprocket assembly according to claim 1, wherein
the support protuberance is disposed to overlap with a center of the fourth tooth when viewed from the axial direction.

26. The bicycle sprocket assembly according to claim 1, wherein
the support protuberance is disposed to overlap one of an opposed pair of outer link plates of the bicycle chain when viewed from the axial direction in a state where the opposed pair of outer link plates of the bicycle chain engage with the first sprocket.

27. A bicycle sprocket assembly comprising:
a first sprocket comprising:
   a first sprocket body including a first radially outer periphery provided about a rotational center axis of the bicycle sprocket assembly;
   a first shifting facilitation area to facilitate a shifting operation of a bicycle chain;
   a plurality of first chain-driving teeth provided on the first radially outer periphery to engage with the bicycle chain, the plurality of first chain-driving teeth including a first tooth being provided in the first shifting facilitation area; and
   a first outer diameter defined by the plurality of first chain-driving teeth; and
a second sprocket adjacent to the first sprocket in an axial direction parallel to the rotational center axis without another sprocket between the first sprocket and the second sprocket, the second sprocket comprising:
   a second sprocket body including a second radially outer periphery provided about the rotational center axis of the bicycle sprocket assembly;
   a plurality of second chain-driving teeth provided on the second radially outer periphery to engage with the bicycle chain;
   a second outer diameter defined by the plurality of second chain-driving teeth, the second outer diameter being larger than the first outer diameter; and
   a support protuberance protruding axially, with respect to a radially central portion of the second sprocket body, toward the first sprocket, the radially central portion being disposed between the support protuberance and the rotational center axis, the support protuberance being positioned in a downstream side with respect to the first tooth in a driving rotational direction in which the bicycle sprocket assembly is rotated about the rotational center axis during pedaling, the support protuberance being configured to axially face one of an opposed pair of outer link plates of the bicycle chain in a state where the opposed pair of outer link plates of the bicycle chain engage with the first sprocket, the support protuberance being spaced apart from a circumferential tooth center line of the first tooth at least by 6 mm in a circumferential direction with respect to the rotational center axis.

28. The bicycle sprocket assembly according to claim 27, wherein
the support protuberance is spaced apart from the circumferential tooth center line of the first tooth at least by 30 mm in the circumferential direction.

29. The bicycle sprocket assembly according to claim 27, wherein
the support protuberance is spaced apart from the circumferential tooth center line of the first tooth at most by 45 mm in the circumferential direction.

30. The bicycle sprocket assembly according to claim 27, wherein
the support protuberance is spaced apart from the circumferential tooth center line of the first tooth at most by 70 mm in the circumferential direction.

31. The bicycle sprocket assembly according to claim 27, wherein
the support protuberance is disposed to overlap with a tooth of the plurality of second chain-driving teeth when viewed from the axial direction.

32. The bicycle sprocket assembly according to claim 27, wherein
the plurality of first chain-driving teeth include, a second tooth, a third tooth, a fourth tooth, and a fifth tooth which are circumferentially arranged in order and which are adjacent to each other without another tooth therebetween, and
the support protuberance is disposed to overlap with a center of the fourth tooth when viewed from the axial direction.

* * * * *